United States Patent
Jung et al.

(10) Patent No.: US 10,148,879 B2
(45) Date of Patent: Dec. 4, 2018

(54) ELECTRONIC DEVICE FOR ACQUIRING STILL IMAGES AND CORRESPONDING VIDEO AND OPERATING METHOD THEREOF

(71) Applicant: SAMSUNG ELECTRONICS CO., LTD., Suwon-si, Gyeonggi-do (KR)

(72) Inventors: Bongsoo Jung, Suwon-si (KR); Bonghyuck Ko, Jeju-si (KR); Changho Kim, Suwon-si (KR); Wooyong Lee, Hwaseong-si (KR); Hyung-Joon Kim, Hwaseong-si (KR); Seungki Park, Hwaseong-si (KR); Jungwon Lee, Incheon (KR); Hoo Hyoung Lee, Suwon-si (KR); Heungki Lee, Suwon-si (KR); Janghee Ryu, Seoul (KR); Hyoung Jin Yoo, Suwon-si (KR); Sangheum Cho, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/434,459

(22) Filed: Feb. 16, 2017

(65) Prior Publication Data
US 2017/0244897 A1    Aug. 24, 2017

(30) Foreign Application Priority Data
Feb. 18, 2016    (KR) ........................ 10-2016-0019141

(51) Int. Cl.
*H04N 5/232* (2006.01)
*H04N 19/426* (2014.01)
(Continued)

(52) U.S. Cl.
CPC ......... *H04N 5/23245* (2013.01); *G11B 27/34* (2013.01); *H04N 1/00244* (2013.01);
(Continued)

(58) Field of Classification Search
CPC .. H04N 5/23245; H04N 19/426; H04N 19/70; H04N 1/00244; H04N 5/2257;
(Continued)

(56) References Cited

U.S. PATENT DOCUMENTS

| 9,648,195 | B2 * | 5/2017 | Kaku ................... H04N 1/2108 |
| 2009/0309988 | A1 * | 12/2009 | Kubo ................... H04N 1/2104 348/220.1 |

(Continued)

FOREIGN PATENT DOCUMENTS

| EP | 0892543 B1 | 11/2003 |
| JP | 2008-160358 | 7/2008 |

(Continued)

OTHER PUBLICATIONS

International Search Report issued in PCT/KR2017/001647 dated May 23, 2017.

(Continued)

*Primary Examiner* — Nicholas G Giles
(74) *Attorney, Agent, or Firm* — Nixon & Vanderhye, P.C.

(57) ABSTRACT

According to various example embodiments of the present disclosure, an electronic device may include: a camera; a display; at least one memory; and a processor operatively coupled to the camera, the display, and the memory. According to various example embodiments of the present disclosure, an electronic device may include: a camera module including a camera; a display; a memory; and a processor operatively coupled to the camera module, the display, and the memory, wherein the processor is configured to acquire an image through the camera module in response to entering a capture mode, to display the acquired image as a preview image through the display, to acquire a still picture from the image in response to an operational instruction for capturing (Continued)

the still picture, to acquire a video from at least one part of the preview image, to generate a still picture file of an image format based on the still picture and a video, and store the still picture file in the memory.

16 Claims, 26 Drawing Sheets

(51) Int. Cl.
| | |
|---|---|
| *H04N 19/70* | (2014.01) |
| *G11B 27/34* | (2006.01) |
| *H04N 1/00* | (2006.01) |
| *H04N 5/225* | (2006.01) |
| *H04N 5/775* | (2006.01) |
| *H04N 9/04* | (2006.01) |
| *H04N 5/77* | (2006.01) |

(52) U.S. Cl.
CPC ....... *H04N 5/2257* (2013.01); *H04N 5/23293* (2013.01); *H04N 5/77* (2013.01); *H04N 5/775* (2013.01); *H04N 9/04* (2013.01); *H04N 19/426* (2014.11); *H04N 19/70* (2014.11)

(58) Field of Classification Search
CPC ...... H04N 5/23293; H04N 5/77; H04N 5/775; H04N 9/04; G11B 27/34
See application file for complete search history.

(56) References Cited

U.S. PATENT DOCUMENTS

| | | | |
|---|---|---|---|
| 2009/0309989 A1* | 12/2009 | Tanaka | H04N 1/2112 348/220.1 |
| 2013/0242124 A1* | 9/2013 | Mukai | H04N 5/23212 348/220.1 |
| 2015/0124121 A1* | 5/2015 | Kaku | H04N 1/2108 348/231.2 |
| 2015/0178318 A1 | 6/2015 | Lee et al. | |
| 2015/0286875 A1* | 10/2015 | Land | H04N 19/46 382/103 |
| 2017/0200314 A1* | 7/2017 | Jeong | G06T 19/006 |

FOREIGN PATENT DOCUMENTS

| | | |
|---|---|---|
| JP | 2014-110446 | 6/2014 |
| JP | 2015-126516 | 7/2015 |
| KR | 20100001622 A | 1/2010 |
| KR | 20100018666 A | 2/2010 |
| KR | 10-2010-0067929 | 6/2010 |
| KR | 20110042856 A | 4/2011 |
| KR | 20110128487 A | 11/2011 |
| KR | 10-2015-0072941 | 6/2015 |

OTHER PUBLICATIONS

Written Opinion of the International Searching Authority issued in PCT/KR2017/001647 dated May 23, 2017.

* cited by examiner

ELECTRONIC DEVICE FOR ACQUIRING STILL IMAGES AND CORRESPONDING VIDEO AND OPERATING METHOD THEREOF

CROSS REFERENCE TO RELATED APPLICATION

The present application is based on and claims priority under 35 U.S.C. § 119 to Korean Application Serial No. 10-2016-0019141, which was filed in the Korean Intellectual Property Office on Feb. 18, 2016, the content of which is incorporated by reference herein in its entirety.

BACKGROUND

1. Field of the Disclosure

The present disclosure relates generally to a method and apparatus for providing a still picture and a video as one piece of data when an image capture is performed in an electronic device.

2. Description of Related Art

Recently, with the development of digital technologies, various types of electronic devices such as a mobile communication terminal, a smart phone, a table, a Personal Computer (PC), a notebook, a wearable device, a digital camera, or the like are widely used. Due to an advanced camera technology based on performance improvement in the electronic device, a resolution of a camera capable of capturing an image is increased. Further, in recent years, with the development of Social Network Services (SNS), a user shares still pictures and videos captured using the camera. For example, in a function provided recently, a video of a high resolution such as 4k is captured (e.g., recorded) and stored, and a significant instantaneous still image is extracted from the stored video, thereby having an effect as if the still picture and the video are simultaneously captured.

However, the conventional method may cause quality deterioration in a still image extracted by a recording operation for a video. For example, in this method, since an image is acquired by decreasing image quality and shooting speed of the still picture (e.g., still image) and by decreasing a frame rate or resolution or the like of the video if a still picture and the video are simultaneously stored, image quality deterioration may occur in the still image. Further, there is a problem in that a user must perform a recording operation instead of having a conventional familiar photographing experience.

SUMMARY

According to various example embodiments, an apparatus and method capable of acquiring a video while capturing a still picture in an electronic device are provided.

According to various example embodiments, an apparatus and method capable of simultaneously acquiring a video while maximizing and/or improving system performance when capturing a still picture in an electronic device are provided.

According to various example embodiments, an apparatus and method capable of storing an image corresponding to a specific time before capturing a still picture, as a video when capturing the still picture in an electronic device are provided.

According to various example embodiments, an apparatus and method capable of storing a video before a still picture even in a very short capture interval in an electronic device are provided.

According to various example embodiments, an apparatus and method capable of generating and storing a still picture and a video as one still picture file, and for reproducing the video stored in the still picture file are provided.

According to various example embodiments, an apparatus and method capable of minimizing and/or reducing a speed delay between image captures, through asynchronous processing in which a pipeline for processing a still picture and a pipeline for performing video recording are split are provided.

According to various example embodiments of the present disclosure, an electronic device may include: a camera; a display; at least one memory; and a processor operatively coupled to the camera, the display, and the memory. The processor may be configured to acquire an image for at least one external object through the camera in response to a first input corresponding to an execution of the camera, to display at least one part of the acquired image as a preview image through the display, wherein the displaying comprises buffering the at least one part of the image in the at least one memory, to acquire a still picture for the at least one external object using the acquired image in response to a second input corresponding to an image capture during display of the preview image, to acquire a video for the at least one external object using the buffered at least one part of the image, to generate a still picture file of an image format based on the still picture and the video, and to store the still picture file in the at least one memory.

According to various example embodiments of the present disclosure, an electronic device may include: a camera module including a camera; a display; a memory; and a processor operatively coupled to the camera module, the display, and the memory. The processor may be configured to acquire an image through the camera module in response to entering a capture mode, to display the acquired image as a preview image through the display, to acquire a still picture from the image in response to an operational instruction for capturing the still picture, to acquire a video from at least one part of the preview image, to generate a still picture file of an image format based on the still picture and a video, and to store the still picture file in the memory.

According to various example embodiments of the present disclosure, a method of operating an electronic device may include acquiring an image through a camera in response to a first input corresponding to an execution of the camera, displaying the acquired image as a preview image through a display, acquiring a still picture from the image in response to a second input corresponding to capturing of the still picture, acquiring a video from at least one part of the preview image, generating a still picture file of an image format based on the still picture and the video, and storing the still picture image in the memory.

In order to address the aforementioned problem, various example embodiments of the present disclosure may include a computer readable recording medium having a program for allowing a processor to execute the above method.

BRIEF DESCRIPTION OF THE DRAWINGS

The above and other aspects, features and attendant advantages of the present disclosure may be more readily appreciated and understood from the following detailed description, taken in conjunction with the accompanying drawings, in which like reference numerals refer to like elements, and wherein.

DETAILED DESCRIPTION

Figure 1:
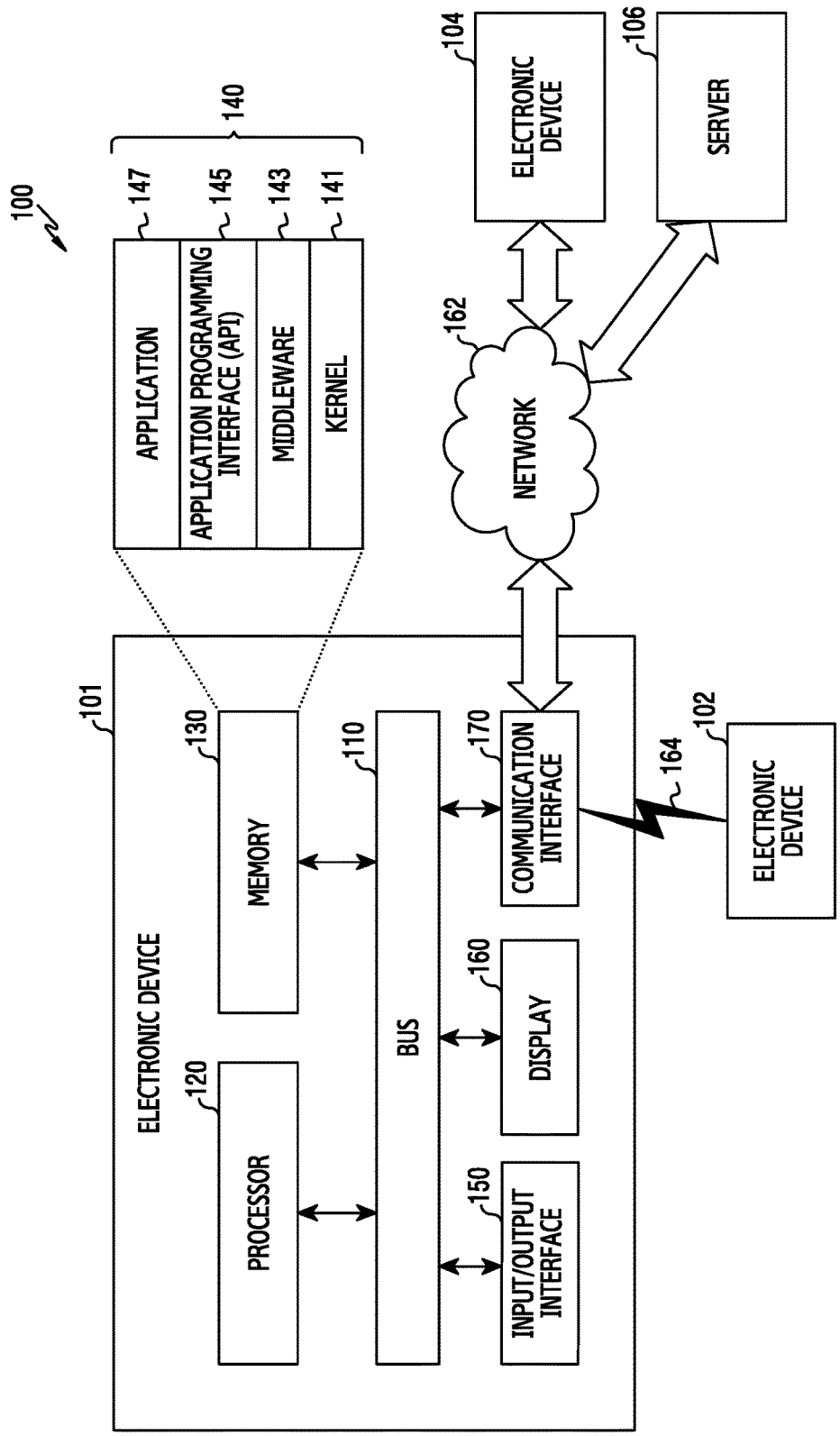
FIG. 1 is a diagram illustrating an example network environment including an electronic device according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer to a situation in which that the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even where the term is defined in the present disclosure, it should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR) , a Flight Data Recorder (FDR) , a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various example embodiments of the present disclosure may be a combination of one or more of the aforementioned various devices. The electronic device according to some embodiments of the present disclosure may be a flexible device. Further, the electronic device according to an example embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an electronic device according to various example embodiments of the present disclosure.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an example embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101. An operation of processing (or controlling) the processor 120 according to various example embodiments will be described below in detail with reference to the accompanying drawings.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The memory 130 may include a computer readable recording medium having a program recorded thereon to execute the method according to various example embodiments in the processor 120.

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various input/output circuitry and function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS).

The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various example embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
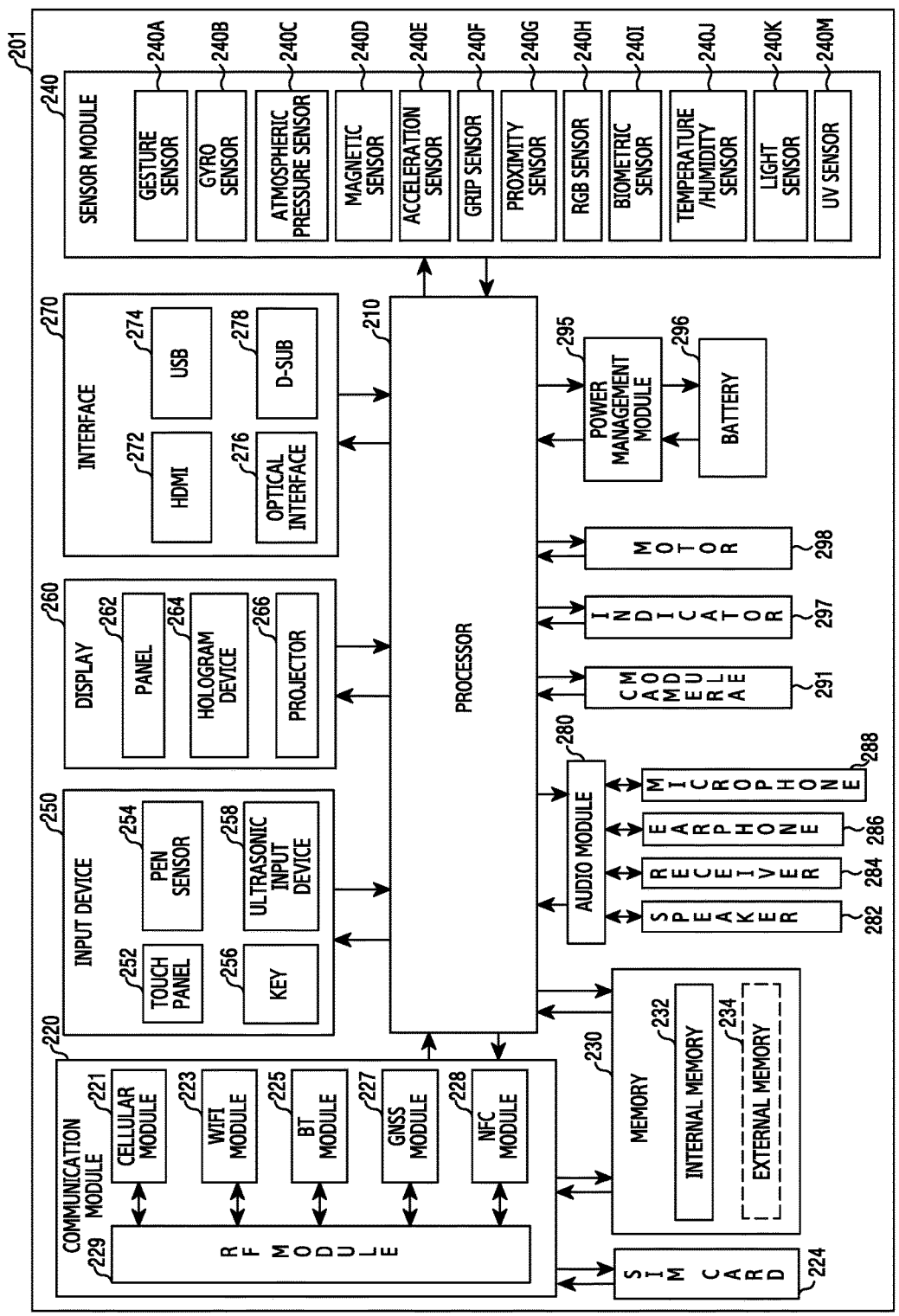
FIG. 2 is a block diagram illustrating an example electronic device according to various example embodiments of the present disclosure.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298.

The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 may include various circuitry including, for example, and without limitation, a camera, a device which may photograph a still image and a video, or the like. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or media-FLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
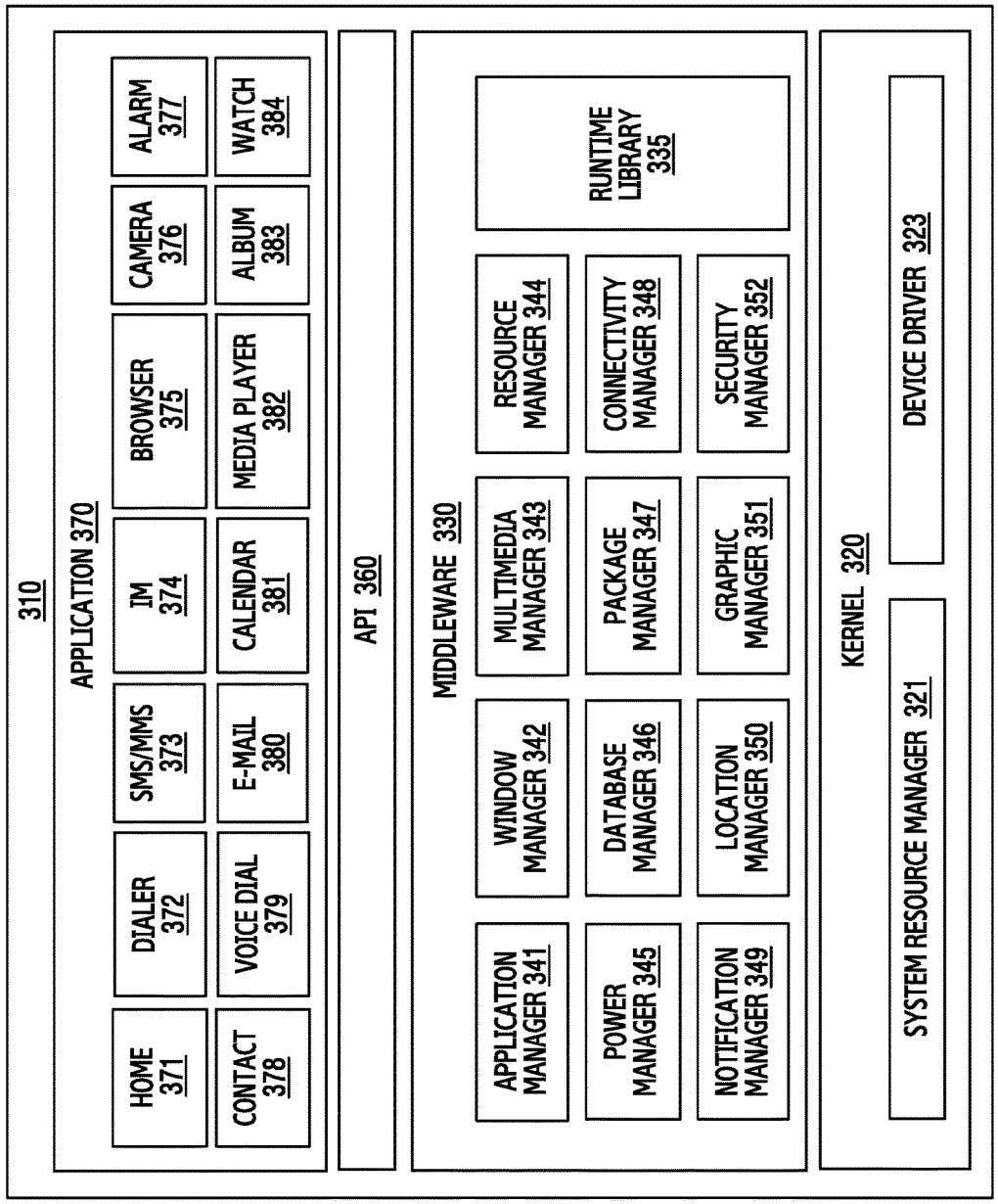
FIG. 3 is a block diagram illustrating an example program module according to various example embodiments of the present disclosure.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an example embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, a contact 378, a voice dial 379, an email 380, a calendar 381, a media player 382, an album 383, a watch 384. According to various example embodiments, the application 370 may include an application for providing a health care (e.g., for measuring exercise quantity or blood sugar, etc.), or environment information (e.g., providing atmospheric pressure, humidity, or temperature information).

According to an example embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an example embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various example embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various example embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Various example embodiments of the present disclosure disclose an apparatus and method capable of storing an image corresponding to a specific time before or after a reference time point of a still picture capture, when a still picture (e.g., a still image) is captured in an electronic device. According to various example embodiments, when an image is captured in an electronic device, a still picture and a video can be acquired together even if a capture interval is very short (e.g., a continuous capture, a speed shot, etc.). According to various example embodiments, the still picture and the video may be generated and stored as one still picture file, and the still picture and video stored in the still picture file may be reproduced. According to various example embodiments, the still picture and the video may be stored by being divided additionally, and connectivity information of the video (e.g., link information, etc.) may be added to the still picture, thereby reproducing the still picture and the video linked to the still picture.

An electronic device according to various example embodiments of the present disclosure supports a camera function, and may include all devices using one or more of various processors (e.g., processing circuitry) such as a dedicated processor, an Application Processor (AP), a Communication Processor (CP), a Graphic Processing Unit (GPU), a Central Processing Unit (CPU), or the like. For example, the electronic device according to various example embodiments may include all information communication devices, multimedia devices, wearable devices, Internet of Things (IoT) devices, or application devices supporting the camera function.

Hereinafter, an operating method and apparatus will be described according to various example embodiments with reference to the accompanying drawings. However, since the various example embodiments of the present disclosure are not restricted or limited by the content described below, it should be noted that the present disclosure is applicable to the various example embodiments on the basis of example embodiments described below. A hardware-based access method is described for example in the various example embodiments of the present disclosure described hereinafter. However, since the various example embodiments of the present disclosure include a technique in which hardware and software are both used, a software-based access method is not excluded in the example embodiments of the present disclosure.

Figure 4:
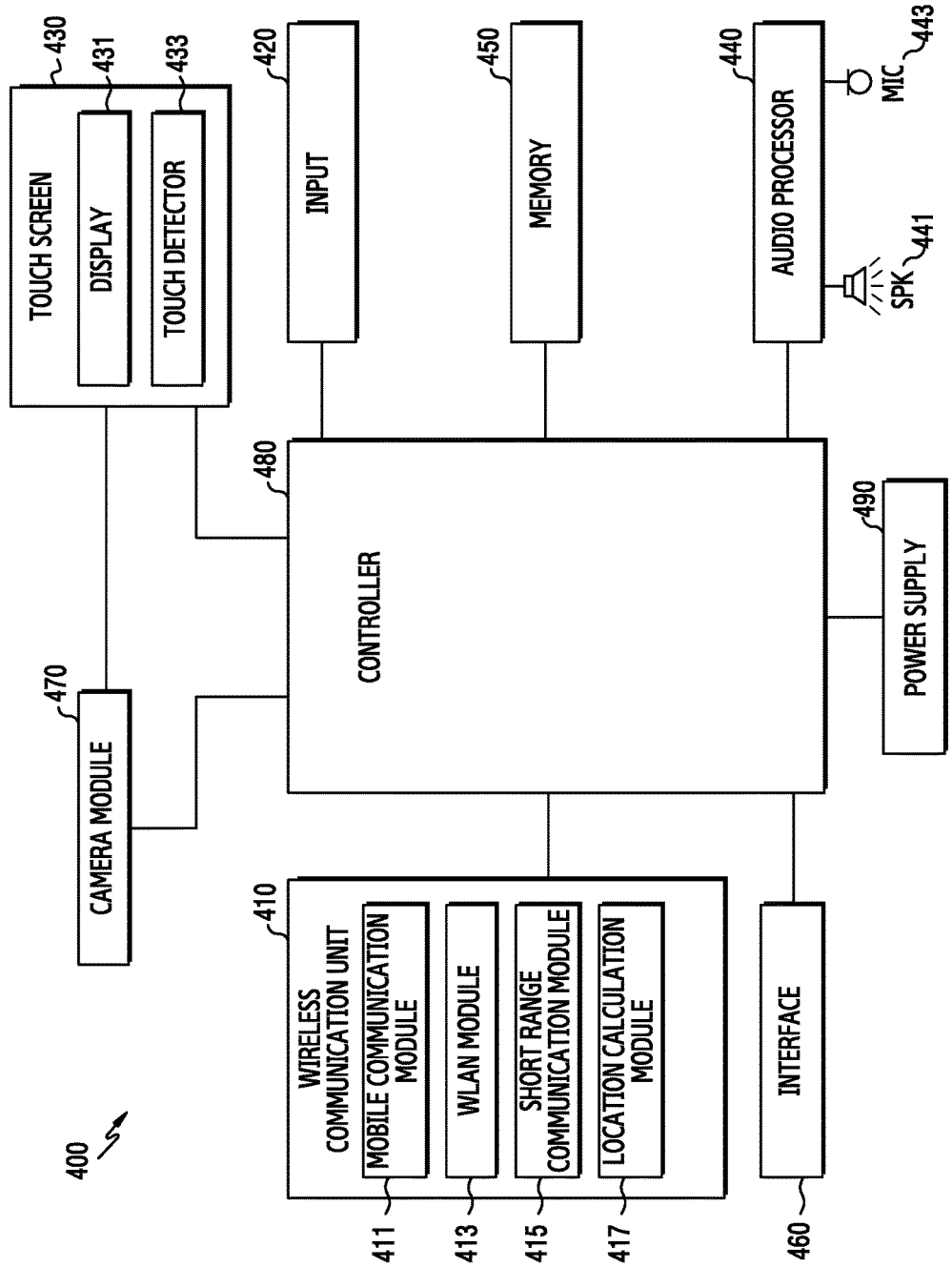
FIG. 4 is a block diagram illustrating an example structure of an electronic device according to various example embodiments of the present disclosure.

FIG. 4 is a diagram illustrating an example structure of an electronic device according to various example embodiments of the present disclosure.

Referring to FIG. 4, an electronic device 400 according to various example embodiments of the present disclosure may include, for example, a wireless communication unit (e.g., including wireless communication circuitry) 410, an input (e.g., including input circuitry) 420, a touch screen 430, an audio processor 440, a memory 450, an interface (e.g., including interface circuitry) 460, a camera module (e.g., including a camera) 470, a controller (e.g., including processing circuitry) 480 (e.g., the processor 120), and a power supply 490. In various example embodiments of the present disclosure, the electronic device 400 is not necessarily constructed of components of FIG. 4, and thus the number of components thereof may be greater than or less than the number of components of FIG. 4.

The wireless communication unit 410 may be constructed identically or similarly, for example, to the communication module 220 of FIG. 2. The wireless communication unit 410 may include one or more modules for enabling wireless communication between the electronic device 400 and a different external electronic device (e.g., the electronic device 102 or 104, the server 106). For example, the wireless communication unit 410 may include various communication circuitry, such as, for example, and without limitation, a mobile communication module 411, a Wireless Local Area Network (WLAN) module 413, a short range communication module 415, a location calculation module 417, or the like. In various example embodiments, the wireless communication unit 410 may include a module for performing communication with a neighboring external electronic device (e.g., a short range communication module, a long range communication module, or the like).

The mobile communication module 411 may be constructed identically or similarly, for example, to the cellular module 221 of FIG. 2. The mobile communication module 411 may include various communication circuitry configured to transmit/receive a radio signal with respect to at least one of a base station, an external electronic device (e.g., the different electronic device 104), and various servers (e.g., an application server, a management server, an integration server, a provider server, a content server, an internet server, a cloud server, etc.) on a mobile communication network. The radio signal may include a voice signal, a data signal, or various types of control signals. The mobile communication module 411 may transmit a variety of data required for an operation of the electronic device 400 to an external device (e.g., the server 106 or the different electronic device 104 or the like) in response to a user request.

The WLAN module 413 may be constructed identically or similarly, for example, to the WiFi module 223 of FIG. 2. The WLAN module 413 may indicate a module for establishing a WLAN link with respect to a wireless Internet access and the different external electronic device (e.g., the different electronic device 102 or the server 106 or the like). The WLAN module 413 may include various communication circuitry and may be placed inside or outside the electronic device 400. A wireless Internet technique may use Wireless Fidelity (WiFi), Wireless broadband (Wibro), World interoperability for Microwave access (WiMax), High Speed Downlink Packet Access (HSDPA), millimeter Wave (mmWave), or the like. The WLAN module 413 may transmit a variety of data of the electronic device 400 to the outside or receive the data from the outside by interworking with the different external electronic device (e.g., the different electronic device 102, etc.) connected to the electronic device 400 through a network (e.g., the wireless Internet network) (e.g., the network 162). The WLAN module 413 may remain always in an on-state, or may be turned on according to a configuration of the electronic device 400 or a user input.

The short range communication module 415 may indicate a module for performing short range communication. A short range communication technique may use Bluetooth, Bluetooth Low Energy (BLE), Radio Frequency IDentification (RFID), Infrared Data Association (IrDA), Ultra Wideband (UWB), ZigBee, Near Field Communication (NFC), or the like. The short range communication module 415 may include various communication circuitry and may transmit a variety of data of the electronic device 400 to the outside or receive the data from the outside by interworking with the different external electronic device (e.g., the different electronic device 102, etc.) connected to the electronic device 400 through a network (e.g., a short range communication network). The short range communication module 415 may remain always in an on-state, or may be turned on according to a configuration of the electronic device 400 or a user input.

The location calculation module 417 may be constructed identically or similarly, for example, to the GNSS module 227 of FIG. 2. The location calculation module 417 is a module for acquiring a location of the electronic device 400, and a representative example thereof may include a Global Position System (GPS) module. The location calculation module 417 may measure the location of the electronic device 400 according to a triangulation principle. p The input 420 may include various input circuitry and generate input data for controlling the operation of the electronic device 400 in response to a user input. The input 420 may include at least one input means for detecting various user inputs. For example, the input 420 may include various input circuitry, such as, for example, and without limitation, a key pad, a dome switch, a physical button, a touch pad (static pressure/electrostatic), jog & shuttle, a sensor (e.g., the sensor module 240), or the like.

The input 420 may be partially implemented outside the electronic device 400 in a button form, and may be partially or entirely implemented with a touch panel. The input 420 may receive a user input for initiating the operation (e.g., a capture function, a data generation function, a data reproduction function, etc.) of the electronic device 400 according to various example embodiments of the present disclosure, and may generate an input signal based on the user input.

The touch screen 430 may refer, for example, to an input/output device capable of simultaneously performing an input function and a display function, and may include a display 431 (e.g., the display 160 or 260) and a touch detector 433. The touch screen 430 provides an input/output interface between the electronic device 400 and the user, and may deliver a touch input of the user to the electronic device 400, or may play a mediation role for showing an output from the electronic device 400 to the user. The touch screen 430 may show a visual output to the user. The visual output may be shown in a form of a text, a graphic, a video, and a combination of them.

The display 431 may display (output) a variety of information processed in the electronic device 400. For example, the display 431 may display a User Interface (UI) or a Graphic UI (GUI) related to an operation of capturing an image, an operation of reproducing a still picture and a video from the captured image, an option (or function) for the capturing, or the like by the electronic device 400 according to whether it is medically certified. Various displays (e.g., the display 160) may be used as the display 431. In various example embodiments, a bended display may be used as the display 431.

The touch detector 433 may be mounted on the display 431, and may detect a user input which is in contact with or approaches to a surface of the touch screen 430. The user input may include a touch event or a proximity event which is input based on at least one of a single-touch, a multi-touch, a hovering, and an air gesture. In various example embodiments, the touch detector 433 may receive a user input for initiating an operation related to a usage of the electronic device 400, and may generate an input signal depending on the user input.

According to various example embodiments, the touch detector 433 may be configured to translate a change in a pressure applied to a specific portion of the display 431 or a capacitance or the like which is generated at a specific portion of the display 431 into an electrical input signal. The touch detector 433 may detect a location and area in which an input tool (e.g., a user's finger, an electronic pen, etc.) is in touch with or approaches to the surface of the display 431. Further, the touch detector 433 may be implemented to be able to detect up to a pressure (e.g., a force touch) when a touch is made according to an applied touch mechanism.

The audio processor 440 may be constructed identically or similarly, for example, to the audio module 280 of FIG. 2. The audio processor 440 may perform a function of transmitting an audio signal input from the controller 480 to a speaker (SPK) 441 and delivering an audio signal such as a voice or the like input from a microphone (MIC) 443 to the controller 480. The audio processor 440 may output voice/sound data by translating it into an audible sound through the SPK 441 under the control of the controller 480, and may deliver an audio signal such as a voice or the like received from the MIC 443 by translating it into a digital signal.

The SPK 441 may, for example, be realized as a speaker, and may output audio data received from the wireless communication unit 410 or stored in the memory 450. The SPK 441 may output a sound signal related to various operations (functions) performed in the electronic device 400.

The MIC 443 may, for example, be realized as a microphone, and may receive an external sound signal, and may process it as electrical voice data. Various noise reduction algorithms may be implemented in the MIC 443 to remove a noise generated in a process of receiving the external sound signal. The MIC 443 may manage an input of audio streaming such as a voice command (e.g., a voice command for initiating a function of performing the capture, setting an option (or function) of the capture, etc.).

The memory 450 (e.g., the memory 130 or 230) may store one or more programs executed by the controller 480, and may perform a function for temporarily storing data to be input/output. The data to be input/output may include, for example, a file such as a video, an image, a photo, an audio, or the like. The memory 450 may play a role of storing acquired data in such a manner that data acquired on a real-time basis is stored in a temporary storage device (e.g., a buffer) and data confirmed to be stored is stored in a long-term storage device.

In various example embodiments, the memory 450 may store one or more programs, data, or instructions for allowing the controller 480 (e.g., the processor) to acquire an image through the camera module 470 in response to entering a capture mode, display the acquired image as a preview image through the display 431, acquire a still picture from the image in response to an operational instruction for capturing the still picture, acquire a video from at least one part of the preview image, generate a still picture file of an image format on the basis of the still picture and a video, and store the still picture file in the memory 450.

In various example embodiments, the memory 450 may store one or more programs, data, or instructions for allowing the controller 480 (e.g., the processor) to perform buffering on at least one part of the preview image, and generate the video on the basis of an image corresponding to a specific time before or after a time point of an operational instruction from the buffered preview image in response to the operational instruction.

In various example embodiments, the memory 450 may store one or more programs, data, or instructions for allowing the controller 480 (e.g., the processor) to analyze a selected image in response to an input for displaying the image, determine a type of the selected image, divide a still picture part and a video part from the still picture file if the selected image is a still picture file comprising a video, display the still picture by extracting the still picture part from the still picture file, reproduce and display the video at a start location of the video part from the still picture file after displaying the still picture, and display the still picture upon completion of the reproducing of the video.

The memory 450 may include one or more application modules (or software modules).

The interface 460 may be constructed identically or similarly, for example, to the interface 270 of FIG. 2. The interface 460 may include various interface circuitry and receive data transmitted from the different electronic device, or may deliver supplied power to each component inside the electronic device 400. The interface 460 may allow data inside the electronic device 400 to be transmitted to the different electronic device. For example, a wired/wireless headphone port, an external charger port, a wired/wireless data port, a memory card port, an audio input/output port, a video input/output port, an earphone port, or the like may be non-limiting examples of interface circuitry included in the interface 460. According to various example embodiments, if the electronic device 400 and an external camera are connected in a wired communication manner, the connection may be achieved on the basis of at least one port of the interface 460.

The camera module 470 (e.g., the camera module 291) is configured to support a capturing function of the electronic device 400 and may include a camera. The camera module 470 may capture any subject under the control of the controller 480, and may deliver captured data (e.g., an image) to the display 431 and the controller 480.

According to various example embodiments, the camera module 470 may include, for example, a first camera (e.g., a color (RGB) camera) for acquiring color information and a second camera (e.g., an InfraRed (IR) camera) for acquiring depth information (e.g., location information and distance information of the subject). The camera module 470 may include an image sensor. The image sensor may be implemented with a Charged Coupled Device (CCD) or a Complementary Metal-Oxide Semiconductor (CMOS), or the like. According to one example embodiment, the first camera may be a front camera provided in a front surface of the electronic device 400. According to various example embodiments, the front camera may be replaced with the second camera, and may not be provided in the front surface of the electronic device 400. According to various example embodiments, the first camera may be disposed to the front surface of the electronic device 400 together with the second camera. According to one example embodiment, the first camera may be a rear camera provided in a rear surface of the electronic device 400. According to one example embodiment, the first camera may include both of the front camera and the rear camera which are provided respectively to the front surface and the rear surface of the electronic device 400.

The controller 480 (e.g., the processor, the control circuit) may include various processing circuitry configured to provide an overall control to the electronic device 400. In various example embodiments, the controller 480 may be constructed identically or similarly, for example, to the processor 210 of FIG. 2.

In various example embodiments, the controller 480 may perform acquiring an image through the camera module 470 in response to entering a capture mode, displaying the acquired image as a preview image through the display 431, acquiring a still picture from the image in response to an operational instruction for capturing the still picture, acquiring a video from at least one part of the preview image, generating a still picture file of an image format on the basis of the still picture and the video, and an operation of storing the still picture image in the memory 450.

In various example embodiments, the controller 480 may process operations of buffering at least one part of the preview image, and generating the video on the basis of an image corresponding to a specific time before or after a time point of an operational instruction from the buffered preview image in response to the operational instruction.

In various example embodiments, the controller 480 may perform detecting an input for displaying the still picture file stored in the memory 450, dividing a still picture part and a video part from the still picture file, displaying the still picture by extracting the still picture part from the still picture file, reproducing and displaying the video at a start location of the video part from the still picture file after displaying the still picture, and displaying the still picture upon completion of the reproducing of the video.

The controller 480 may include one or more processors for controlling the operation of the electronic device 400. In various example embodiments, the controller 480 may control an operation of a hardware module such as the audio processor 440, the interface 460, the display 431, the camera module 470, or the like. An operation of controlling the controller 480 will be described in greater detail with reference to drawings described below according to various example embodiments of the present disclosure. According to various example embodiments of the present disclosure, the controller 480 may be implemented with one or more processors for controlling the operation of the electronic device 400 according to various example embodiments of the present disclosure by executing one or more programs stored in the memory 450.

The power supply 490 may supply power required for an operation of each element by receiving external power and internal power under the control of the controller 480. In various example embodiments of the present disclosure, the power supply 490 may supply or turn on/off power to the wireless communication unit 410, the display 431, the camera module 470, or the like under the control of the controller 480.

Figure 5:
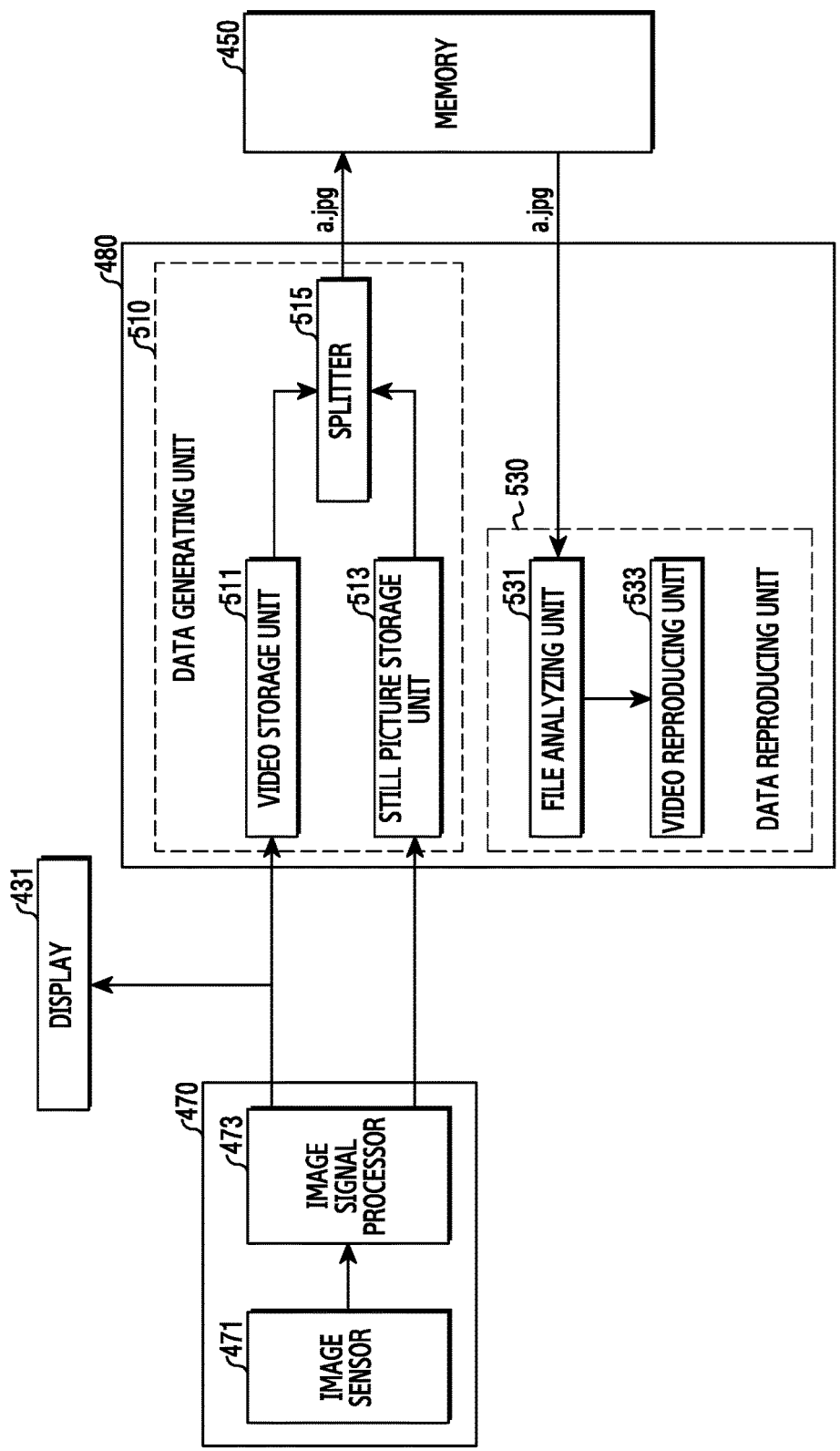
FIG. 5 is a diagram illustrating an example data processing structure in an electronic device according to various example embodiments of the present disclosure.
Figure 6A:
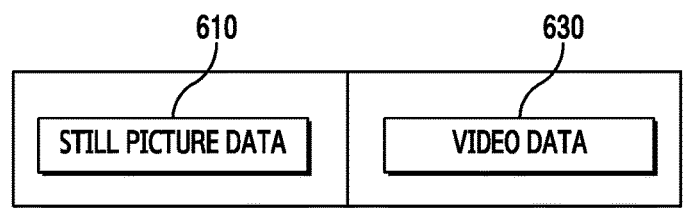
FIG. 6A and FIG. 6B are diagrams illustrating examples of a still picture file structure according to various example embodiments of the present disclosure.
Figure 6B:
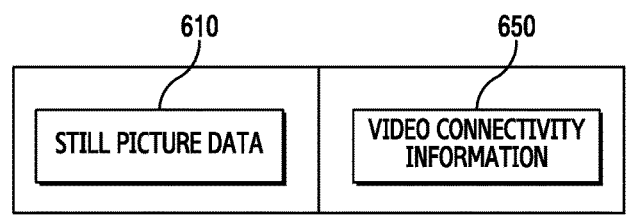

FIG. 5 is a diagram illustrating an example data processing structure in an electronic device according to various example embodiments of the present disclosure, and FIG. 6A and FIG. 6B are diagrams illustrating examples of a still picture file structure according to various example embodiments of the present disclosure.

As illustrated in FIG. 5, in various example embodiments, a still picture may be captured using the camera module 470, and a video may be generated together when the still picture is captured, so as to be generated and stored as one still picture file (e.g., a jpeg file). In various example embodiments, the still picture file in which the still picture and the video are configured as one file (e.g., a .jpg) may be reproduced respectively as the still picture and the video.

Referring to FIG. 5, an image acquired (projected) through an image sensor 471 (e.g., a front sensor or a rear sensor) of the camera module 470 may be subjected to signal processing as an image for a preview output based on the display 431 through an Image Signal Processor (ISP) 473, a still picture (e.g., a still image) to be captured actually, and a video corresponding to a specific time before the still picture.

For example, the ISP 473 may provide an image having a low resolution and having a smaller size (hereinafter, a first image or a low-resolution image) than an actually captured image to the display 431 as a preview image to be displayed on the display 431 of the electronic device 400. The ISP 473 may provide the preview image to the controller 480. According to various example embodiments, in the ISP 473, the first image may be provided as a path for displaying the preview image by means of the display 431 and a path for acquiring a video by means of the controller 480.

The ISP 473 may provide the controller 480 with an image having a higher quality and resolution (hereinafter, a second image or a high-resolution image) than the preview image, as a still picture to be captured in response to a user input (e.g., a capture button input). According to various example embodiments, the second image may be captured at least partially based on a capture option (e.g., a resolution, quality, size, etc.) configured in the electronic device 400, and may be captured with various qualities and resolutions according to the capture option.

The controller 480 may include, for example, a data generating unit 510 and a data reproducing unit 530. The data generating unit 510 may include a video storage unit 511, a still picture storage unit 513, and a splitter 515. The video storage unit 511 and the still picture storage unit 513 may be constructed of at least one buffer. The data reproducing unit 530 may include a file analyzing unit 531 and a video reproducing unit 533.

According to various example embodiments, the controller 480 may receive a user's configuration (e.g., a capture resolution, a focus, a capture button, etc.), and may control a camera configuration change, a still picture capture, a video capture, and a storage. The controller 280 may receive a first image (e.g., a video, a preview image) and a second image (e.g., a still picture) from the ISP 473. The first image may be stored (e.g., buffered) through the video storage unit 511, and the second image may be stored (e.g., buffered) through the still picture storage unit 513. The controller 480 may integrate the first image (e.g., the video) and the second image (e.g., the still picture) which are respectively stored in the video storage unit 511 and the still picture storage unit 513, through the splitter 515.

According to various example embodiments, the controller 480 may determine a storing (e.g., buffering) type of the first image (e.g., the video) at least partially based on electric current consumption of the electronic device 400, a state of the memory 450, a quality of an image to be stored (e.g., the still picture, the video), or the like. When the still picture is captured on the basis of a user input, the controller 480 may operate to acquire (generate) the video on the basis of an image corresponding to a specific time before or after a still picture capture time. For example, upon detecting the capture of the still picture, the controller 480 may operate to store the still picture in the still picture storage unit 513, and may operate to store the video buffered by a specific time before or after the still picture capture time.

The controller 480 may operate to configure one still picture file (e.g., a jpeg file, for example, a .jpg) by integrating (adding) the video stored in the video storage unit 511 to an end part of the still picture stored in the still picture storage unit 513 through the splitter 515. The controller 480 may configure the still picture and the video as one still picture file, and may store the configured still picture file (e.g., a .jpg) in the memory 450. According to various example embodiments, an example of the still picture file is illustrated in FIG. 6A and FIG. 6B.

As illustrated in FIG. 6A, FIG. 6A illustrates an example of a jpeg file (a still picture file) structure in which a still picture and a video are integrated. The jpeg file may be configured as one file by being divided into still picture data 610 and video data 630. According to various example embodiments, a still picture and a compressed video may be generated as one jpeg file. For example, the still picture and the video may be stored and managed as one jpeg file, instead of being stored and managed in different memory areas.

According to various example embodiments, the controller 480 may reproduce a still picture file (e.g., a jpeg file, for example, a .jpg) in which a still picture and a video are configured as one file in response to a user input (e.g., an image reproduction input) and may display it through the display 431. According to an example embodiment, the controller 480 may detect a user input for reproducing the still picture file (e.g., a .jpg) stored in the memory 450. The controller 480 may analyze and divide (or split) a still picture part (e.g., the still picture data 610 of FIG. 6A) and a video part (e.g., the video data 630 of FIG. 6A) from the still picture file (e.g., a .jpg) through the file analyzing unit 531 in response to the user input. The controller 480 may control the video reproducing unit 533 to reproduce the video part from the still picture file and to display it through the display 431. According to an example embodiment, the controller 480 may display the still picture part from the still picture file through a still picture application (e.g., a gallery application) (not shown), and may reproduce the video part from the still picture file through the video reproducing unit 533. According to an example embodiment, the controller 480 may reproduce the video from a start location of the video after the still picture in the still picture file. The controller 480 may operate to end the reproducing of the video at an end location of the video and to display the still picture again.

FIG. 6B illustrates another example of a still picture file structure according to various example embodiments. According to various example embodiments, the still picture file may be configured as one file by being divided into the still picture data 610 and video connectivity information 650 and may be stored at one location of the memory 450, and the video data 630 may be stored in another location of the memory 450 in addition to the still picture. According to various example embodiments, the video may be stored at another location of the memory 450, and may be generated as a still picture file by adding connectivity information (e.g., link information) of a video stored at another location of the memory 450 to an end part of the still picture. For example, the still picture and the video may be managed by being stored in different memory areas. The connectivity information may include, for example, a location of the memory 450 in which the video is stored, a file name of the video, or the like.

According to various example embodiments, the controller 480 may reproduce the still picture file in which the still picture and the video connectivity information are configured as one file in response to a user input (e.g., an image reproduction input), and may display it through the display 431. According to one example embodiment, the controller 480 may detect the user input for reproducing the still picture file stored at a first location of the memory 450. The controller 480 may analyze and divide (or split) a still picture part (e.g., the still picture data 610 of FIG. 6A) and a video part (e.g., the video data 630 of FIG. 6A) from the still picture file through the file analyzing unit 531 in response to the user input. The controller 480 may control the video reproducing unit 533 to reproduce the video stored at a second location of the memory 450 on the basis of video connectivity information from the still picture file and to display it through the display 431. According to an example embodiment, the controller 480 may display the still picture part from the still picture file through a still picture application (e.g., a gallery application), and may reproduce the video part from the still picture file through the video reproducing unit 533. According to an example embodiment, when the reproducing of the video at the second location of the memory 450 is complete, the controller 480 may operate to display again the still picture at the first location of the memory 450.

As described above, the electronic device 400 according to various example embodiments of the present disclosure may include: the camera (e.g., the camera module 470); the display 431; at least one memory 450, and the processor (e.g., the controller 480) operatively coupled to the camera, the display, and the memory. The processor may be configured to acquire an image of at least one external object through the camera in response to a first input corresponding to an execution of the camera, to display at least one part of the acquired image as a preview image through the display wherein the displaying includes buffering the at least one part of the image in the at least one memory, to acquire a still picture for the at least one external object using the acquired image in response to a second input corresponding to an image capture during the preview image is displayed, to acquire a video for the at least one external object using the buffered at least one part of the image, to generate a still picture file of an image format based on the still picture and the video, and store the still picture file in the at least one memory.

According to various example embodiments, the first input may include an input for requesting for entering a mode designated for a camera, and for example, may include an input for entering at least one capture mode among various capture modes (e.g., a simultaneous capture mode, a motion photo capture mode, etc.) of the electronic device 400. According to various example embodiments, the second input may include an input requesting a still picture capture. According to various example embodiments, the at least one part of the acquired image may include a preview image divided according to a resolution, a size, or the like or a YUV image included in the preview image.

According to various example embodiments, an image or video for the at least one external object may be acquired at least partially based on a real-time video of a real-world subject (e.g., a real capture object) which is input on a real-time basis through the camera.

According to various example embodiments, the processor may be configured to generate the video based on an image corresponding to a specific time before a second input time point from the buffered at least one part of the image in response to the second input.

According to various example embodiments, the processor may be configured to determine a device state in response to the first input, to determine a buffering type for storing the video at least partially based on the device state, to process the video based on a first buffering operation if first operation information is determined with the buffering type, and to process the video based on a second buffering operation if second operation information is determined with the buffering type.

According to various example embodiments, the processor may be configured to determine the device state at least partially based on a size of the memory, electric current consumption of the encoder, image processing capability, or a high-resolution video capture.

According to various example embodiments, the processor may be configured to determine the first operation information if the size of the memory is small (e.g., less than a threshold memory size) and electric current consumption of the encoder is low (e.g., lower than a threshold electric current consumption), and to determine the second operation information if the size of the memory is great and low power is required.

According to various example embodiments, the processor may be configured to, upon determining the first operation information, acquire the video on the basis of a buffering type in which the preview image is first encoded and thereafter buffered, and upon determining the second operation information, to acquire the video on the basis of a buffering type in which a YUV image included in the preview image is first buffered and thereafter encoded.

According to various example embodiments, the processor may be configured to, if the second input is an input corresponding to a continuous still picture capture, in response to the second input, acquire a first still picture corresponding to a first time point and a second still picture corresponding to a second time point, and a first video corresponding to the first still picture and a second video corresponding to the second still picture, and to generate a first still picture file of the image format based on the first still picture and the first video, and a second still picture file of the image format based on the second still picture and the second video.

According to various example embodiments, the processor may be configured to determine whether the second input is a still picture capture based on a first capture scheme or a continuous still picture capture based on a second capture scheme at least partially based on a capture interval time and a specific time.

According to various example embodiments, the processor may be configured to acquire the first video and the second video as one video until a third time point at which the capture time interval is longer than the specific time.

According to various example embodiments, the processor may be configured to analyze a selected image in response to a third input for displaying the image, to determine a type of the selected image, to divide a still picture part and a video part from the still picture file if the selected image is a still picture file comprising a video, to display the still picture by extracting the still picture part from the still picture file, to reproduce and display the video at a start location of the video part from the still picture file after displaying the still picture, and to display the still picture upon completion of the reproducing of the video.

According to various example embodiments, the processor may be configured to analyze selected data in response to a fourth input for sharing data, to determine a type of the selected data, determine a sharing scheme on the basis of an interface for selecting the sharing scheme if the selected data is a still picture file comprising video, and to share selectively the still picture file, a still picture of the still picture file, or a video of the still picture file in response to the determined sharing scheme.

As described above, the electronic device 400 according to various example embodiments of the present disclosure may include: the camera module 470; the display 431; the memory 450, and the processor (e.g., the controller 480) operatively coupled to the camera 470, the display 431, and the memory 450. The processor may be configured to acquire an image through the camera module in response to entering a capture mode, to display the acquired image as a preview image through the display, to acquire a still picture from the image in response to an operational instruction for capturing the still picture, acquire a video from at least one part of the preview image, to generate a still picture file of an image format based on the still picture and a video, and store the still picture file in the memory.

According to various example embodiments, the processor may be configured to perform buffering on at least one part of the preview image, and to generate the video based on an image corresponding to a specific time before or after a time point of an operational instruction from the buffered preview image in response to the operational instruction.

According to various example embodiments, the processor may be configured to determine a device state upon entering the capture mode, to determine a buffering type for storing the video at least partially based on the device state, to process the video based on a first buffering operation if first operation information is determined with the buffering type, and to process the video based on a second buffering operation if second operation information is determined with the buffering type.

According to various example embodiments, the processor may be configured to determine the device state at least partially based on a size of the memory, electric current consumption of an encoder, image processing capability, or a high-resolution video capture.

According to various example embodiments, the processor may be configured to determine the first operation information if the size of the memory is small (e.g., less than a predetermined threshold memory size value) and electric current consumption of the encoder is low (e.g., lower than a predetermined electric current consumption value), and to determine the second operation information if the size of the memory is great and low power is required.

According to various example embodiments, the processor may be configured to generate the video based on a buffering type in which the preview image is first encoded and thereafter buffered if the first operation information is determined, and to generate the video based on a buffering type in which a YUV image included in the preview image is first buffered and thereafter encoded if the second operation information is determined.

According to various example embodiments, the processor may be configured to acquire the still picture upon detecting an operational instruction for capturing the still picture, and to acquire independently or collectively the video corresponding to the still picture based on a capture scheme corresponding to the operational instruction.

According to various example embodiments, the processor may be configured to determine whether it is a normal capture based on a first capture scheme or a burst shot based on a second capture scheme in response to an operational instruction for capturing the still picture at least partially based on a capture interval time and a specific time, upon determining the first capture scheme, to acquire an image corresponding to a specific time before a corresponding time point as a video for one still picture on the basis of a time point of capturing the still picture, and to generate a sill picture file based on the still picture and the video, and upon determining the second capture scheme, to acquire persistently one video until a time point at which the capture interval time is longer than the specific time, to acquire from the video an image corresponding to a specific time before each time point based on a plurality of time points for capturing the still picture as videos corresponding to respective still pictures, and to generate a plurality of still picture files on the basis of the respective still pictures and the respective videos.

According to various example embodiments, the processor may be configured to analyze a selected image in response to an input for displaying the image, to determine a type of the selected image, to divide a still picture part and a video part from the still picture file if the selected image is a still picture file comprising a video, to display the still picture by extracting the still picture part from the still picture file, to reproduce and display the video at a start location of the video part from the still picture file after displaying the still picture, and to display the still picture upon completion of the reproducing of the video.

According to various example embodiments, the processor may be configured to reproduce and display automatically the video after displaying the still picture, or reproduce or display the video in response to a selection of a video guide item.

According to various example embodiments, the processor may be configured to analyze selected data in response to an input for sharing data, to determine a type of the selected data, to determine a sharing scheme on the basis of an interface for selecting the sharing scheme if the selected data is a still picture file comprising video, and to share selectively the still picture file, a still picture of the still picture file, or a video of the still picture file in response to the determined sharing scheme.

Figure 7:
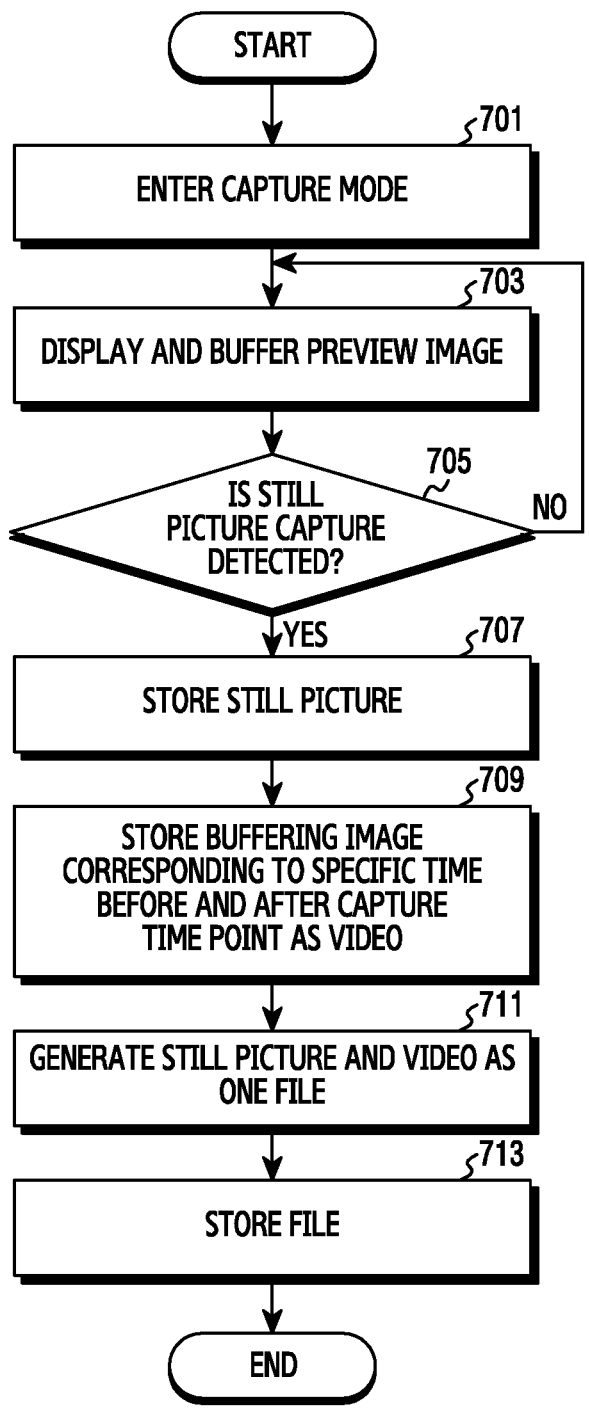
FIG. 7 is a flowchart illustrating an example method of operating an electronic device according to various example embodiments of the present disclosure.

FIG. 7 is a flowchart illustrating an example method of operating an electronic device according to various example embodiments of the present disclosure.

Referring to FIG. 7, when the processor 480 (e.g., a processor including a processing circuitry) of the electronic device 400 enters a capture mode in operation 701, an operation of displaying and buffering a preview image may be processed in operation 703. For example, in response to an execution of a camera application, the controller 480 may operate to display through the display 431 a preview image which is input through the camera module 470 and to perform buffering on the preview image through the video storage unit 511.

In operation 705, the controller 480 may determine whether there is an input for a still picture capture.

If still picture capture is not detected in operation 705 (NO of operation 705), returning to operation 703, the controller 480 may perform operation 703 and its subsequent operations.

If the still picture capture is detected in operation 705 (YES of operation 705), the controller 480 may store a still picture in operation 707. For example, upon detecting an operational instruction for capturing the still picture from a camera application, the controller 480 may capture the still picture in response to the operational instruction and thus may store it in the still picture storage unit 513.

In operation 709, the controller 480 may store a buffering image corresponding to a specific time before and after a corresponding time point as the video, with respect to a time point at which the still picture is captured. For example, upon detecting an operational instruction for capturing the still picture from the camera application, in response to the operational instruction, the controller 480 may store a buffering image which corresponds to a specific time as a video corresponding to the still picture and which is included in a preview image buffered through the video storage unit 511 before or after an operational instruction time point.

According to various example embodiments, operation 707 and operation 709 are not limited to the operational order of FIG. 7, and thus may be performed in sequence, in parallel, or in a reverse order.

In operation 711, the controller 480 may generate the still picture and the video as one file. For example, the controller 480 may combine the still picture of the still picture storage unit 513 and the video of the video storage unit 511 through the splitter 515 to generate one still picture file (e.g., a jpeg file) in an image format.

In operation 713, the controller 480 may store the generated file in the memory 450.

According to various example embodiments, in operation 711, the controller 480 may store a still picture and a video related to the still picture at different locations of the memory 450. In this case, the controller 480 may generate a still picture file by adding connectivity information of the video to an end part of the still picture. For example, the controller 480 may combine connectivity information of the still picture of the still picture storage unit 513 and the video of the video storage unit 511 through the splitter 515 to generate one still picture file (e.g., a jpeg file) in an image format, and may store a real video at another location of the memory 450.

Figure 8A:
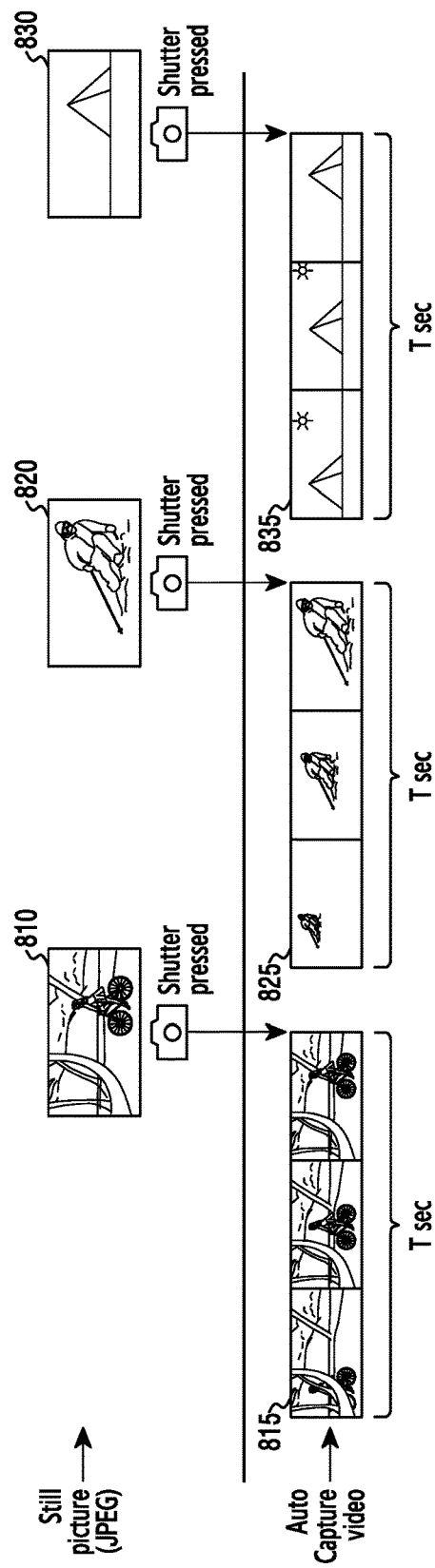
FIG. 8A and FIG. 8B are diagrams illustrating an example operation of generating data of an electronic device according to various example embodiments of the present disclosure.
Figure 8B:
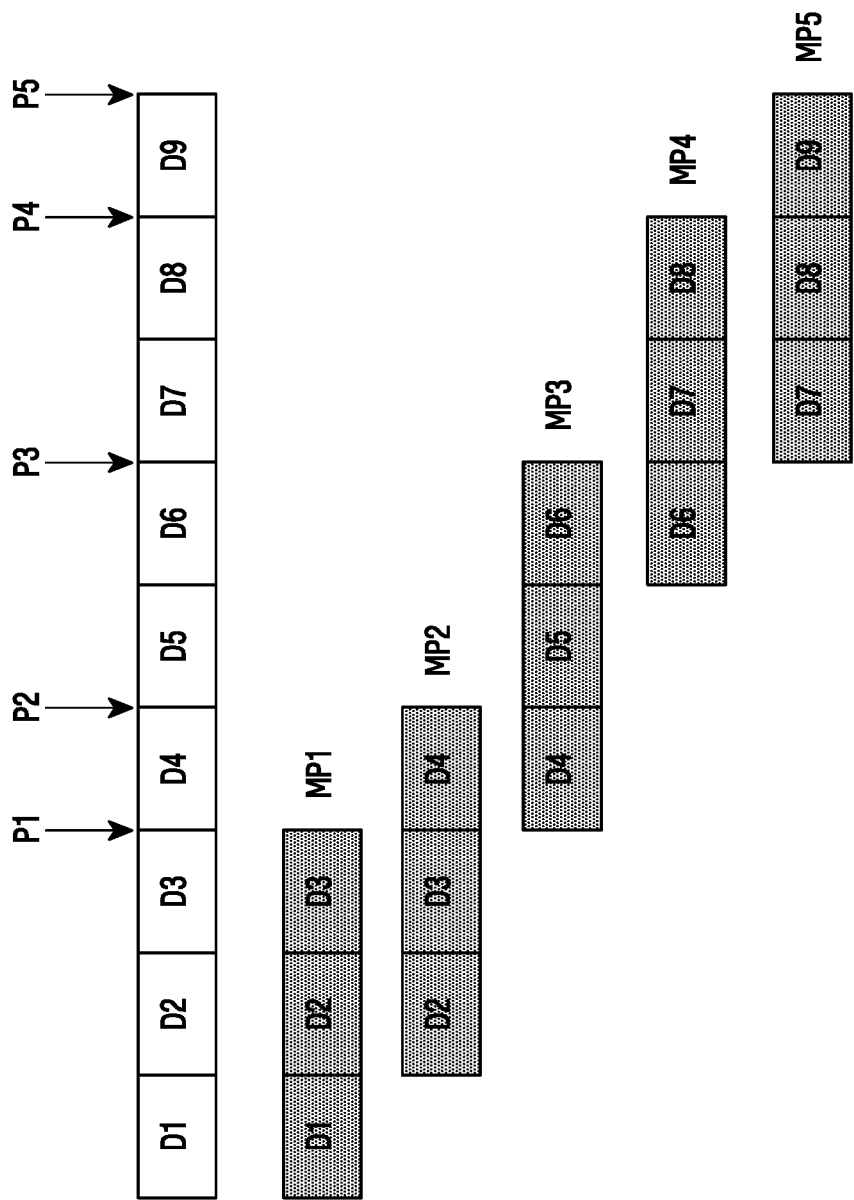

FIG. 8A and FIG. 8B illustrate an example operation of generating data of an electronic device according to various example embodiments of the present disclosure.

As illustrated in FIG. 8A, according to various example embodiments, a preview image corresponding to a specific time (e.g., a T sec, where T is a natural number) is acquired as videos 815, 825, and 835 based on a time point at which still pictures (e.g., still images) 810, 820, and 830 are generated, and the videos 815, 825, and 835 corresponding to the still pictures 810, 820, and 830 may be stored as one file. According to various example embodiments, the captured still picture and video (e.g., the preview image for the time T) may be stored integrally as one file in association with each still picture. According to one example embodiment, the still picture 810 and the video 815 related thereto may be stored as one file at a first capture time point, the still picture 820 and the video 825 association thereto may be stored as one file at a second capture time point, and the still picture 830 and the video 835 associated thereto may be stored as one file at a third capture time point.

Referring to FIG. 8A, upon detecting a button (e.g., a shutter) input (e.g., shutter pressed) for capturing a still picture by a user, the electronic device 400 may capture the still picture (e.g., the still picture 810) at a corresponding time point, and may store a video (e.g., the video 815) corresponding to a T time before the still picture 810. According to one example embodiment, each of the videos 815, 825, and 835 may include the same number of frames (e.g., 3, 4, 5 frames, etc.) during a time T corresponding to each of the still pictures 810, 820, and 830. According to various example embodiments, the time T may be set variously such as 2 sec, 3 sec, 4 sec, 5 sec, etc.

Referring to FIG. 8B, FIG. 8B may illustrate a case where frames corresponding to images of $1^{st}$ data D1 to $9^{th}$ data D9 are input sequentially starting from the $1^{st}$ data D1, and an input (e.g., shutter pressed) for capturing a still picture is performed by a user at a first capture time point P1, a second capture time point P2, a $3^{rd}$ capture time point P3, a $4^{th}$ capture time point P4, and a $5^{th}$ capture time point P5. For convenience of explanation, in the example described in FIG. 8B, one frame is input per second, and a specific time T is 3 sec. According to one example embodiment, in FIG. 8B, the Pt data D1 may be old data which is input first, and the $9^{th}$ data D9 may be recent data which is input lastly.

According to one example embodiment, at the first capture time point P1, the electronic device 400 may acquire one video MP1 on the basis of old data (e.g., the $3^{rd}$ data D3, the $2^{nd}$ data D2, and the $1^{st}$ data D1) for 3 sec before the first capture time point P1. The video MP1 may be reproduced in the order of the $1^{st}$ data D1, the $2^{nd}$ data D2, and the $3^{rd}$ data D3.

According to one example embodiment, at the second capture time point P2, the electronic device 400 may acquire one video MP2 on the basis of old data (e.g., the $4^{th}$ data D4, the $3^{rd}$ data D3, and the $2^{nd}$ data D2) for 3 sec before the second capture time point P2. The video MP2 may be reproduced in the order of the $2^{nd}$ data D2, the $3^{rd}$ data D3, and the $4^{th}$ data D4.

According to one example embodiment, at the $3^{rd}$ capture time point P3, the electronic device 400 may acquire one video MP3 on the basis of old data (e.g., the $6^{th}$ data D6, the $5^{th}$ data D5, and the $4^{th}$ data D4) for 3 sec before the $3^{rd}$ capture time point P3. The video MP3 may be reproduced in the order of the $4^{th}$ data D4, the $5^{th}$ data D5, and the $6^{th}$ data D6.

According to one example embodiment, at the $4^{th}$ capture time point P4, the electronic device 400 may acquire one video MP4 on the basis of old data (e.g., the $8^{th}$ data D8, the $7^{th}$ data D7, and the $6^{th}$ data D6) for 3 sec before the $4^{th}$ capture time point P4. The video MP4 may be reproduced in the order of the $6^{th}$ data D6, the $7^{th}$ data D7, and the $8^{th}$ data D8.

According to one example embodiment, at the $5^{th}$ capture time point P5, the electronic device 400 may acquire one video MP5 on the basis of old data (e.g., the $9^{th}$ data D9, the $8^{th}$ data D8, and the $7^{th}$ data D7) for 3 sec before the $5^{th}$ capture time point P5. The video MPS may be reproduced in the order of the $7^{th}$ data D7, the $8^{th}$ data D8, and the $9^{th}$ data D9.

As illustrated in FIG. 8B, the first capture time point P1 to the $5^{th}$ capture time point P5 may have a shorter capture interval (e.g., a burst shot) than a specific time T. In various example embodiments, if a capture interval time is shorter than a specific time, videos (e.g., MP1 to MP5) based on respective capture time points may overlap in at least one region (or section, frame).

According to one example embodiment, the video MP1 of the first capture time point P1 and the video MP2 of the second capture time point P2 may commonly include the $2^{nd}$ data D1 and the $3^{rd}$ data D3. The video MP2 of the second capture time point P2 and the video MP3 of the $3^{rd}$ capture time point P3 may commonly include the $4^{th}$ data D4. The video MP3 of the $3^{rd}$ capture time point P3 and the video MP4 of the $4^{th}$ capture time point P4 may commonly include the $6^{th}$ data D6. The video MP4 of the $4^{th}$ capture time point P4 and the video MP5 of the $5^{th}$ capture time point P5 may commonly include the $7^{th}$ data D7 and the $8^{th}$ data D8.

In various example embodiments, since a capture interval time ΔT is shorter than a specific time T similarly to a burst shot, each of videos (e.g., MP1 to MP5) may include an overlapping region with respect to at least one different video in accordance with the capture interval time.

In various example embodiments, if the capture interval time ΔT is shorter than the specific time T similarly to the burst shot, data corresponding to a specific time may be acquired in a reverse order from a last capture time point (e.g., a point at which the capture interval time is longer than a specific time, for example, the $5^{th}$ capture time point P5). For example, an operation for configuring a video may be processed by proceeding from the most recent $5^{th}$ capture time point P5 to the first capture time point P1. This may be for allowing the most recently captured image to be viewed to a user on a highest level. In FIG. 8B, the video MP1 may be the oldest video, and the video MP5 may be the latest video.

Figure 9:
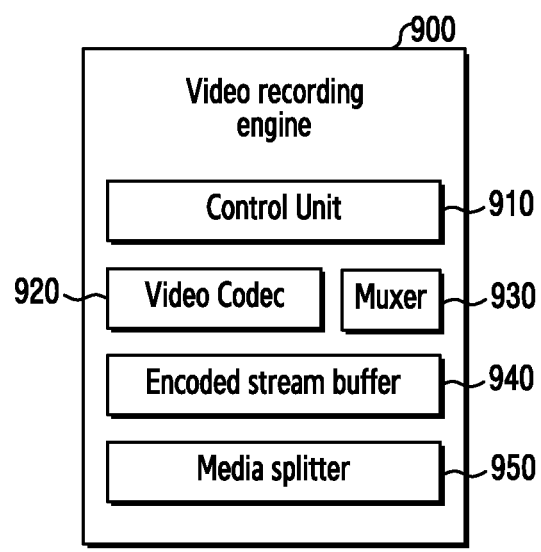
FIG. 9 and FIG. 10 are diagrams illustrating example structures for generating data in an electronic device according to various example embodiments of the present disclosure.
Figure 10:
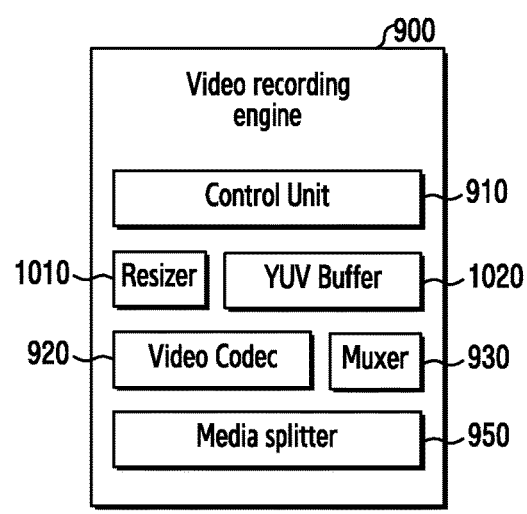

FIG. 9 and FIG. 10 are diagrams illustrating example structures for generating data in an electronic device according to various example embodiments of the present disclosure.

Referring to FIG. 9 and FIG. 10, FIG. 9 and FIG. 10 illustrate examples of a buffering structure for buffering video data in the electronic device 400. According to various example embodiments, the electronic device 400 may include a video recording engine 900 for recoding a preview image (video). In various example embodiments, at least one part of the elements of the video recording engine 900 may be implemented in a software manner similarly to an application module (or a software module) or may be configured in a hardware manner. According to one example embodiment, at least one part of the video recording engine 900 may be included in all or some parts of the controller 480 (e.g., the data generating unit 510 and the data reproducing unit 530) of FIG. 5.

According to various example embodiments, the video recording engine 900 can be implemented by using various buffering schemes (or buffering structures) according to various conditions (e.g., performance, usage status, memory capacity, etc.) of the electronic device 400.

According to an example embodiment, if a memory usage amount is small in the electronic device 400 and it is intended to store a high-quality preview image since the preview image (video) can be compressed without a size change, an operation may be performed by recording the preview image on the basis of the video recording engine 900 of FIG. 9. As illustrated in FIG. 9, the video recording engine 900 may include a control unit 910, a video codec 920, a Muxer 930, an encoded stream buffer 940, and a media splitter 950. In the video buffering scheme of FIG. 9, an encoder (not shown) may always encode the preview image to provide it to the encoded stream buffer 940. This will be described below in detail with reference to the accompanying drawings.

According to one example embodiment, if a memory size of the electronic device 400 is small and it is intended to store a preview image by decreasing electronic current consumption, an operation may be performed by recording the preview image on the basis of the video recording engine 900 of FIG. 10. As illustrated in FIG. 10, the video recording engine 900 of FIG. 10 may include a YUV buffer 1020 instead of the encoded stream buffer 940 of the video recording engine 900 of FIG. 9. Further, additionally or alternatively, the video recording engine 900 of FIG. 10 may include a resizer 1010.

The video buffering scheme of FIG. 10 may perform buffering in such a manner that only a YUV image is extracted from the preview image and is stored through the YUV buffer 1020. In this case, a memory usage amount may be increased, and thus a resolution of the preview image may be decreased through the resizer 1010, or the number of buffering images may be decreased to perform buffering by decreasing a frame rate of video compression through an encoder (not shown). In the video buffering scheme of FIG. 10, since an encoding operation is performed by the encoder when there is a still picture capture input by a user, electric current consumption caused by the encoding of the encoder may be decreased. For example, the video buffering scheme of FIG. 10 has a structure in which an uncompressed YUV image of the preview image is buffered by a specific time (a time T) instead of always performing encoding by the specific time (the time T). According to one example embodiment, in the structure of FIG. 10, YUV data buffered before or after a capture indication time point may be encoded when a still picture capture indication (instruction) is generated while performing only buffering on YUV data without having to perform encoding unlike in the structure of FIG. 9. This will be described below in detail with reference to the accompanying drawings.

In various example embodiments, the resizer 1010 of FIG. 10 may configure or control a size or a resolution with respect to an image (e.g., a preview image) processed through the ISP 473 or an image (e.g., a preview image) stored in a camera buffer (not shown) of the camera module 470. According to one example embodiment, the resizer 1010 of FIG. 10 may be performed by the ISP 473 of the camera module 470.

In various example embodiments, the Muxer 930 of FIG. 9 or FIG. 10 may perform a task for creating a bit-stream compressed by a video encoder into a multimedia container of a specific format (e.g., mp4) so as to be reproduced in the video reproducing unit 533.

According to various example embodiments, at a still picture capture time point, the electronic device 400 may use a buffering scheme for storing a video corresponding to a time T before or after a capture time point through selective determination in the controller 480 (e.g., the control unit 910 of FIG. 9 and FIG. 10) at least partially based on various conditions of the electronic device 400. According to an example embodiment, the controller 480 may select the buffering scheme of FIG. 9 if a size (capacity) of the memory 450 included in the electronic device 400 is small (or an available storage space is less than a specific reference or threshold value) and electronic current consumption of the video encoder is small. According to another example embodiment, the controller 480 may select the buffering scheme of FIG. 10 if a size (capacity) of the memory 450 included in the electronic device 400 is large (or an available storage space is greater than or equal to a specific reference) and low power (e.g., very small electronic current consumption, less than a threshold electric current value) is required.

Figure 11:
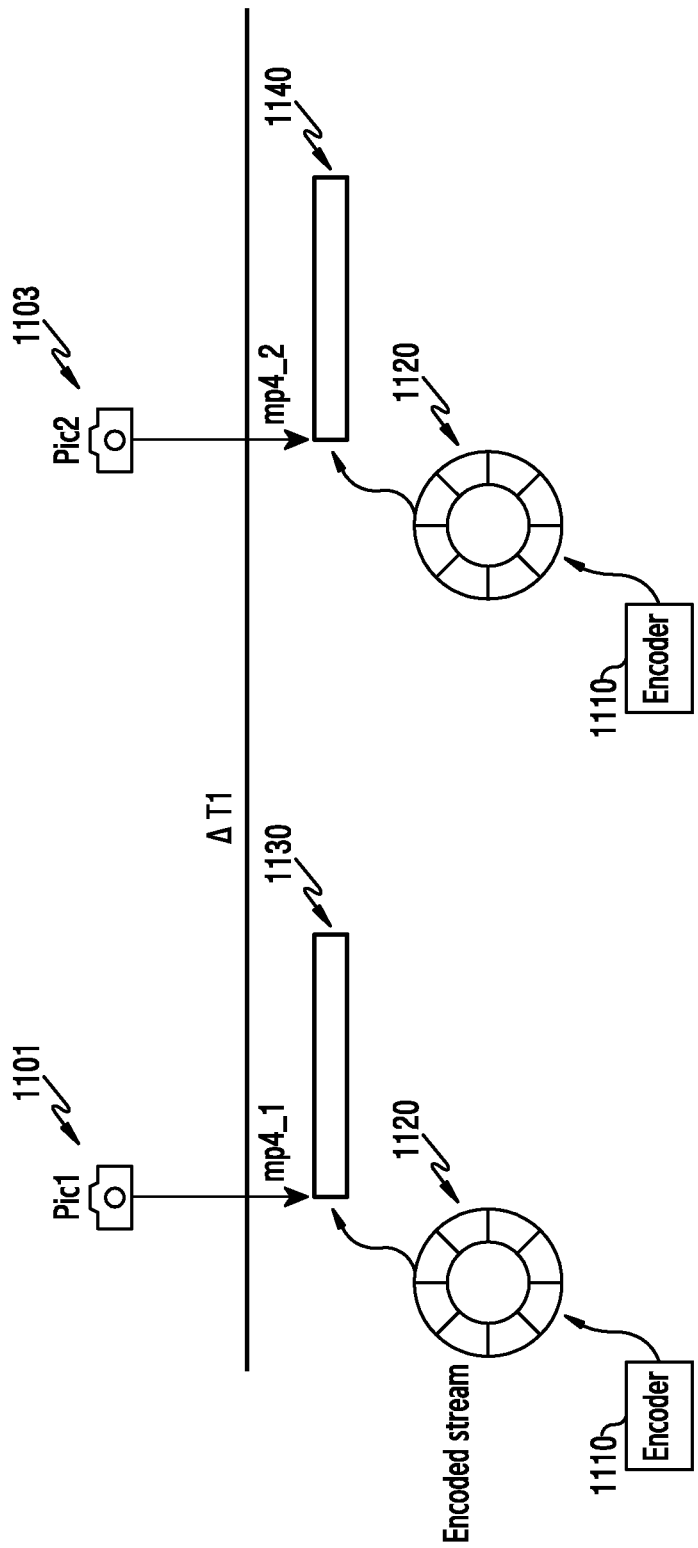
FIG. 11 is a diagram illustrating an example video buffering operation in an electronic device according to various example embodiments of the present disclosure.

FIG. 11 is a diagram illustrating an example video buffering operation in an electronic device according to various example embodiments of the present disclosure.

Referring to FIG. 11, FIG. 11 illustrates an example of performing a video buffering operation based on FIG. 9.

According to various example embodiments, the controller 480 (e.g., the control unit 910 of FIG. 9) may operate to continuously encode a preview image on the basis of an encoder 1110, in a state where an camera application (or function) is executed. According to an example embodiment, upon detecting an operation for outputting the preview image (e.g., camera application activation or the like) from the camera application, in response to an operational instruction, the controller 480 may store in a buffer 1120 (e.g., the encoded stream buffer 940) an encoded bit-stream corresponding to a specific time (e.g., a time T) which is set in the preview image currently being encoded.

According to various example embodiments, upon detecting an operational instruction (e.g., a still picture capture command of operation 1101) for capturing a still picture from the camera application, the controller 480 may store an encoded bit-stream buffered by a specific time (e.g., a time T) as a file (e.g., a video file) 1130, and may store a still picture and a video as one jpeg file through the media splitter 950.

According to various example embodiments, upon detecting an operational instruction (e.g., a still picture capture end) for outputting a preview image from the camera application, in response to the operational instruction, the controller 480 may store in the buffer 1120 an encoded bit-stream corresponding to a specific time (e.g., a time T) which is set in the preview image currently being encoded. Upon detecting an operational instruction (e.g., a still picture capture command of operation 1103) for capturing the still picture from the camera application, the controller 480 may store the encoded bit-stream buffered by the specific time (e.g., the time T) as a file (e.g., a video file) 1140, and may store a still picture and a video as another jpeg file through the media splitter 950.

According to various example embodiments, upon receiving a user input (e.g., a capture command) for capturing a still picture, the electronic device 400 may acquire a video corresponding to a specific time (e.g., a time T) before or after a capture time point of the still picture and may generate the still picture and a vide as one file. The example of FIG. 11 is a case (e.g., ΔT>T) where a capture interval time (e.g., ΔT) for capturing the still picture is longer than a buffering time (e.g., a specific time T) which is set to store an encoded bit-stream related to the video. In this case, video recording may be performed by the specific time (e.g., the time T), so that the still picture and the recorded video are stored as one file (e.g., a jpeg file). According to various example embodiments, the electronic device 400 may acquire a video corresponding to a specific time (e.g., a time T) before or after a still picture capture time point and may store it independently of the still picture. Further, the electronic device 400 may add connectivity information related to a video stored at a different location to the still picture, so as to be generated as one file.

Figure 12:
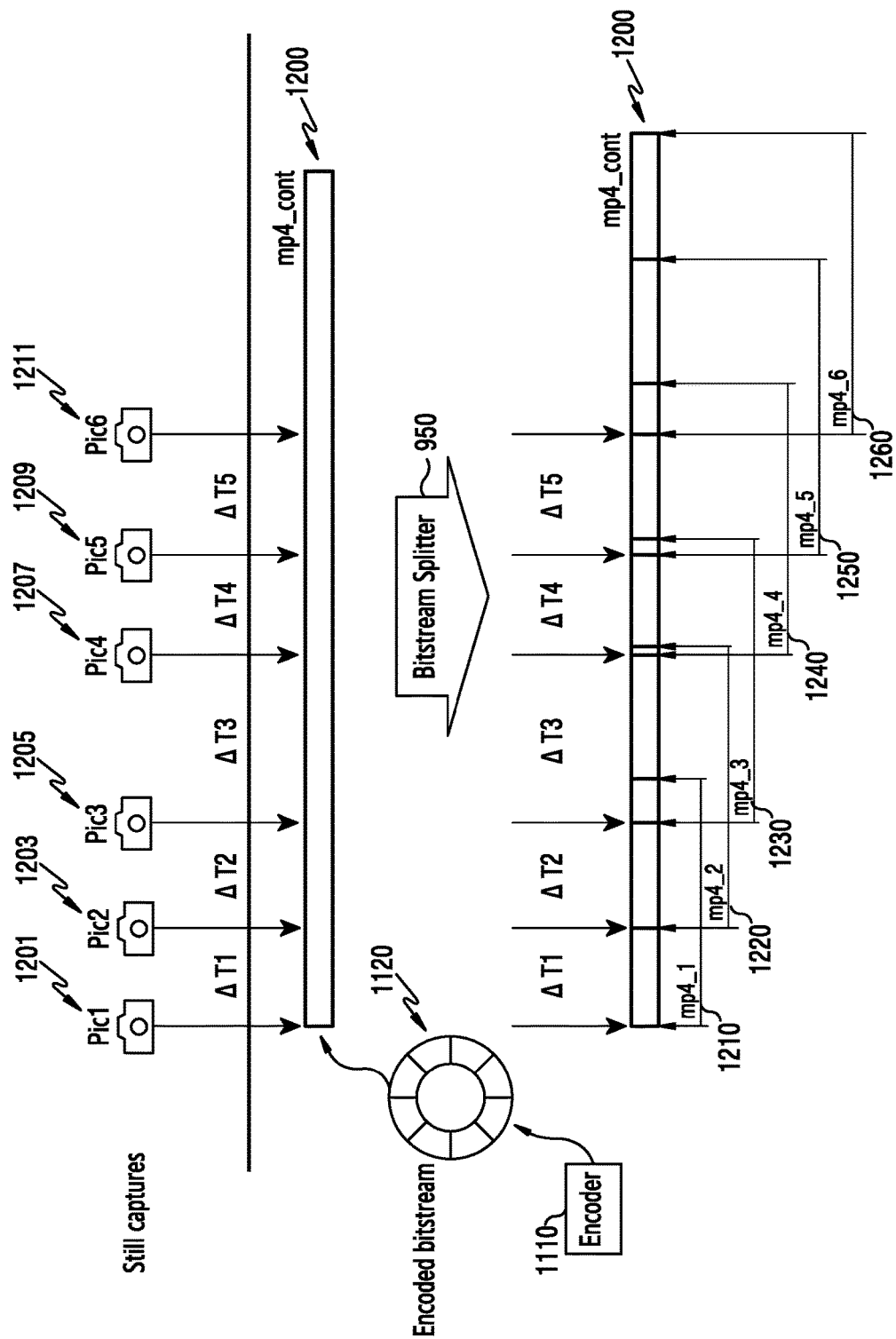
FIG. 12 is a diagram illustrating an example video buffering operation in an electronic device according to various example embodiments of the present disclosure.

FIG. 12 is a diagram illustrating an example video buffering operation in an electronic device according to various example embodiments of the present disclosure.

Referring to FIG. 12, FIG. 12 illustrates an example of performing a video buffering operation based on FIG. 9. In FIG. 12, an example case where a still picture capture interval time ΔT is shorter than a specific time T for storing a video (e.g., ΔT<T) is shown as a burst shot, for example, a continuous still picture capture (e.g., a contiguous capture, a speed shot, etc.) performed by a user.

According to various example embodiments, similarly to the burst shot, even if a capture interval time ΔT for a still picture is less than a buffering time (e.g., a specific time T) configured to store a video (e.g., ΔT<T), recording of the video may be provided by the specific time (e.g., the time T).

According to one example embodiment, as shown in FIG. 12, upon detecting an operational instruction (e.g., a continuous still picture capture command of operations 1201, 1203, 1205, 1207, 1209, and 1211) for capturing a still picture from the camera application in a state where the preview image is output through the display 431, in response to the operational instruction, instead of storing an encoded bit-stream buffered by the specific time (e.g., the time T) from a corresponding time point, the controller 480 may continuously store an encoded bit-stream buffered in the buffer 1120 until a time point at which a capture interval time ΔT is longer than the specific time T as a file (e.g., a video file) 1200.

According to an example embodiment, the controller 480 may continuously extract (or split, cut) from the encoded file 1200 a corresponding still picture (e.g., still pictures captured according to respective operational instructions of operation 1201 to operation 1211) and a video region (or section) corresponding (or related) to the corresponding still picture by the specific time (e.g., the time T) until a time point at which the capture interval time ΔT is longer than the specific time T through the media splitter 950 (or bit-stream splitter). The controller 480 may store the still picture and the extracted video corresponding to each still picture as one jpeg file. For example, as shown in operation 1201 to 1211, 6 still pictures may be acquired by performing an operational instruction 6 times, and 6 videos 1210, 1220, 1230, 1240, 1250, and 1260 corresponding to the 6 still pictures may be extracted from the video file 1200. The controller 480 may generate 6 jpeg files by associating the 6 still pictures with the extracted 6 videos. Accordingly, in various example embodiments, the video can also be ensured by a defined specific time (e.g. the time T) in a capture scheme having a very short capture interval.

According to various example embodiments, if the capture interval time ΔT is shorter than the specific time T similarly to the continuous capture or the like, videos associated with respective still pictures based on a continuous operational instruction may overlap in at least one region (or section, frame).

For example, a video mp4_1 1210 corresponding to a first operational instruction may be constructed of at least one first frame corresponding to a time T before or after a first operational instruction time point (operation 1201). A video mp4_2 1220 corresponding to a second operational instruction may be constructed of at least one second frame corresponding to a time T before or after a time of a second operational instruction time point (operation 1203). In this case, since the capture interval time ΔT1 based on the first operational instruction (operation 1201) and the second operational instruction (operation 1203) is shorter than the time T, the first frame corresponding to the video mp4_1 1210 and the second frame corresponding to the video mp4_2 1220 may overlap at least partially (e.g., may be the same image).

According to one example embodiment, if it is assumed that the time T is 3 sec, the capture interval time ΔT1 is 1 sec, and one frame exists per sec, then the video mp4_1 1210 may be constructed of 3 first frames corresponding to 1 sec, 2 sec, and 3 sec, and the video mp4_2 1220 may be constructed of 3 second frames corresponding to 2 sec, 3 sec, and 4sec according to the capture interval time ΔT1. Accordingly, the video mp4_1 1210 and the video mp4_2 1220 may commonly include a frame corresponding to 2 sec and 3 sec, for example, may include the same region. As such, according to the capture interval times ΔT1, ΔT2, ΔT3, ΔT4, and ΔT5, the respective videos mp4_1 to mp4_6 1210 to 1260 may include a region overlapping with at least one different video.

Figure 13:
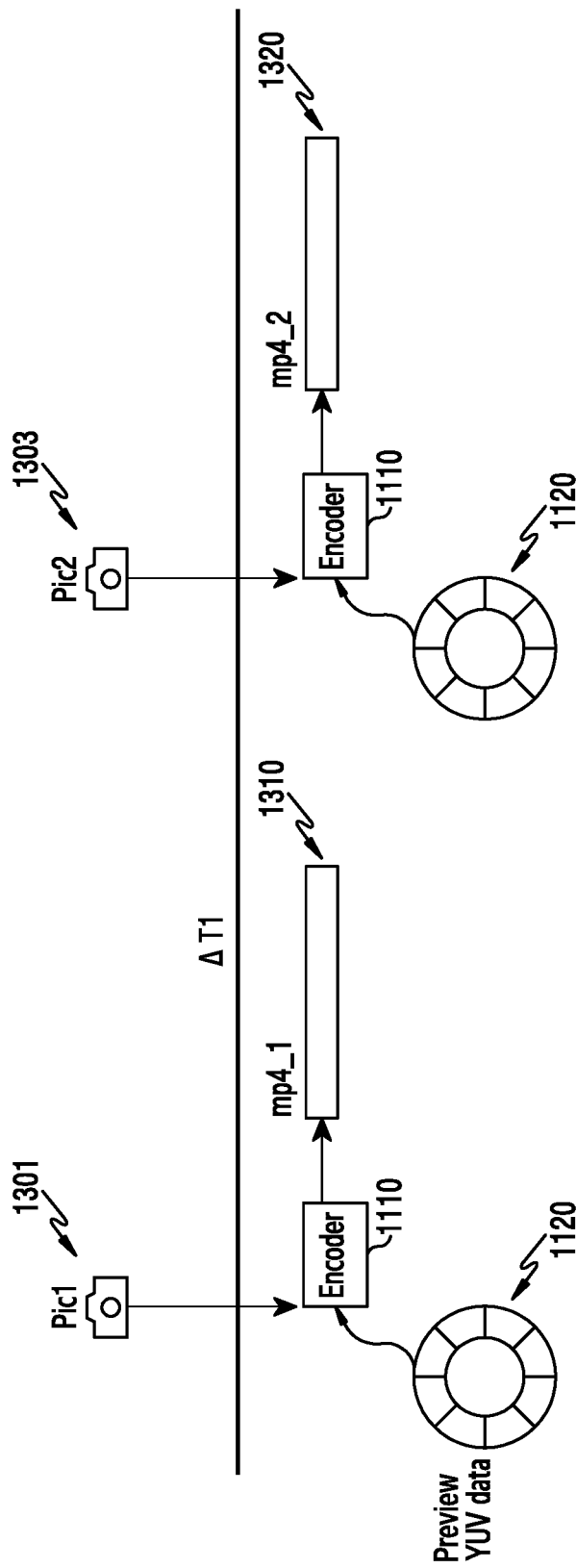
FIG. 13 is a diagram illustrating an example video buffering operation in an electronic device according to various example embodiments of the present disclosure.

FIG. 13 is a diagram illustrating an example video buffering operation in an electronic device according to various example embodiments of the present disclosure.

Referring to FIG. 13, FIG. 13 illustrates an example of performing a video buffering operation based on FIG. 10.

According to various example embodiments, the controller 480 (e.g., the control unit 910 of FIG. 10) may operate to perform buffering on a preview image in a state where a camera application (or function) is executed. In various example embodiments, the controller 480 may operate to perform buffering on a YUV image in the buffer 1120 (e.g., the YUV buffer 1020) from the preview image. According to one example embodiment, upon detecting an operational instruction (e.g., a camera application activation or the like) for outputting the preview image from the camera application, the controller 480 may encode the YUV image buffered in the buffer 1120 through the encoder 1110 in response to the operational instruction. The controller 480 may store an image as a file (e.g., a video file) on the basis of the YUV image encoded by the encoder 1110 for a specific time (e.g., a time T). The controller 480 may allow to end the encoding operation after the YUV image is encoded for a specific time according to the operational instruction.

According to various example embodiments, upon detecting an operational instruction (e.g., a still picture capture command of operation 1301) for capturing a still picture from the camera application, in response to the operational instruction, the controller 480 may encode a YUV image buffered by a specific time (e.g., a time T) which is set in the buffered YUV image and store it as a file (e.g., a video file) 1310, and may store a still picture and a video as one jpeg file through the media splitter 950.

According to various example embodiments, in response to an operational instruction, the controller 480 may encode a YUV image buffered by a specific time (e.g., a time T) which is set in a buffered YUV image and store it independently of a still picture as a file (e.g., a video file) 1310, and may store it as one file by adding connectivity information related to a video stored at another location to the still picture through the media splitter 950.

According to various example embodiments, upon detecting an operational instruction (e.g., after a still picture capture) for outputting a preview image from the camera application, in response to the operational instruction, the controller 480 may stop (end) encoding and store the YUV image in the buffer 1120. Upon detecting an operational instruction (e.g., a still picture capture command of operation 1303) for capturing the still picture from the camera application, in response to the operational instruction, the controller 480 may encode the YUV image buffered by a specific time (e.g., a time T) which is set in the buffered YUV image and store it as a file (e.g., a video file) 1320, and may store a still picture and a video as one jpeg file through the media splitter 950.

According to various example embodiments, upon receiving a user input (e.g., a capture command) for capturing a still picture, the electronic device 400 may acquire a video corresponding to a specific time (e.g., a time T) before or after a capture time point of the still picture and may generate the still picture and a vide as one file. The example of FIG. 13 is a case (e.g., ΔT>T) where a capture interval time (e.g., ΔT) for capturing the still picture is longer than a buffering time (e.g., a specific time T) which is set in relation to the video. In this case, video recording may be performed by the specific time (e.g., the time T), so that the still picture and the recorded video are stored as one file (e.g., a jpeg file).

Figure 14:
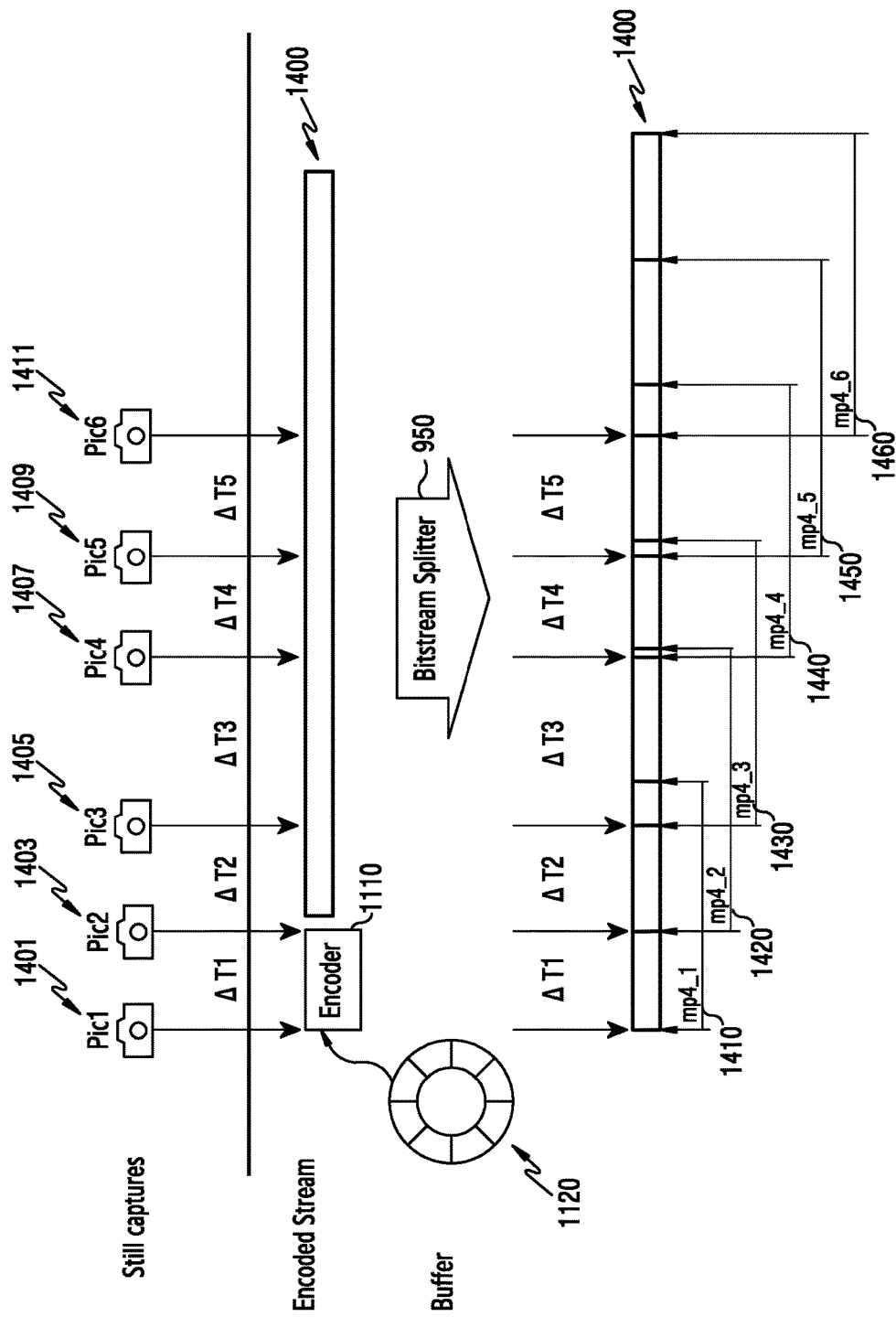
FIG. 14 is a diagram illustrating an example video buffering operation in an electronic device according to various example embodiments of the present disclosure.

FIG. 14 is a diagram illustrating an example video buffering operation in an electronic device according to various example embodiments of the present disclosure.

Referring to FIG. 14, FIG. 14 illustrates an example of performing a video buffering operation based on FIG. 10. The example of FIG. 14 is a case (e.g., ΔT<T) where a still picture capture interval time ΔT is shorter than a specific time T for storing a video when a user uses a burst shot, for example, a continuous still picture capture scheme (e.g., a continuous capture, a speed shot, etc.).

According to various example embodiments, as illustrated in FIG. 14, upon detecting an operational instruction (e.g., a contiguous still picture capture command of operations 1401, 1403, 1405, 1407, 1409, and 1411) for capturing a still picture from the camera application in a state where the preview image is output through the display 431, in response to the operational instruction, the controller 480 may encode a YUV image buffered by a specific time (e.g., a time T) with respect to a corresponding time and thereafter, instead of ending the encoding operation, may continuously encode the buffered YUV image of the buffer 1120, for example, until a time point at which a capture interval time ΔT is longer than a specific time T and may store it as a file (e.g., a video file) 1400.

According to one example embodiment, the controller 480 may continuously extract (or split, cut) from the encoded file 1400 a corresponding still picture (e.g., still pictures captured according to respective operational instructions of operation 1401 to operation 1411) and a video region (or section) corresponding (or related) to the corresponding still picture by the specific time (e.g., the time T) until a time point at which the capture interval time ΔT is longer than the specific time T through the media splitter 950 (or bit-stream splitter). The controller 480 may store the still picture and the extracted video corresponding to each still picture as one jpeg file. For example, as shown in operation 1401 to 1411, 6 still pictures may be acquired by performing an operational instruction 6 times, and 6 videos 1410, 1420, 1430, 1440, 1450, and 1460 corresponding to the 6 still pictures may be extracted from the video file 1400. The controller 480 may generate 6 jpeg files by associating the 6 still pictures with the extracted 6 videos. Accordingly, in various example embodiments, the video can also be ensured by a defined specific time (e.g. the time T) in a capture scheme having a very short capture interval.

According to various example embodiments, if the capture interval time ΔT is shorter than the specific time T similarly to the continuous capture or the like, videos associated with respective still pictures based on a continuous operational instruction may overlap in at least one region (or section).

For example, a video mp4_1 1410 corresponding to a first operational instruction may be constructed of at least one first frame corresponding to a time T before or after a first operational instruction time point (operation 1401). A video mp4_2 1420 corresponding to a second operational instruction may be constructed of at least one second frame corresponding to a time T before or after a second operational instruction time point (operation 1403). In this case, since the capture interval time ΔT based on the first operational instruction (operation 1401) and the second operational instruction (operation 1403) is shorter than the time T, the first frame corresponding to the video mp4_1 1410 and the second frame corresponding to the video mp4_2 1420 may overlap at least partially (e.g., may be the same image).

According to an example embodiment, if it is assumed that the time T is 3 sec, the capture interval time ΔT1 is 1 sec, and one frame exists per sec, then the video mp4_1 1410 may be constructed of 3 first frames corresponding to 1 sec, 2 sec, and 3 sec, and the video mp4_2 1420 may be constructed of 3 second frames corresponding to 2 sec, 3 sec, and 4 sec according to the capture interval time ΔT1. Accordingly, the video mp4_1 1410 and the video mp4_2 1420 may commonly include a frame corresponding to 2 sec and 3 sec, for example, may include the same region. As such, according to the capture interval times ΔT1, ΔT2, ΔT3, ΔT4, and ΔT5, the respective videos mp4_1 to mp4_6 1410 to 1460 may include a region overlapping with at least one different video.

Figure 15:
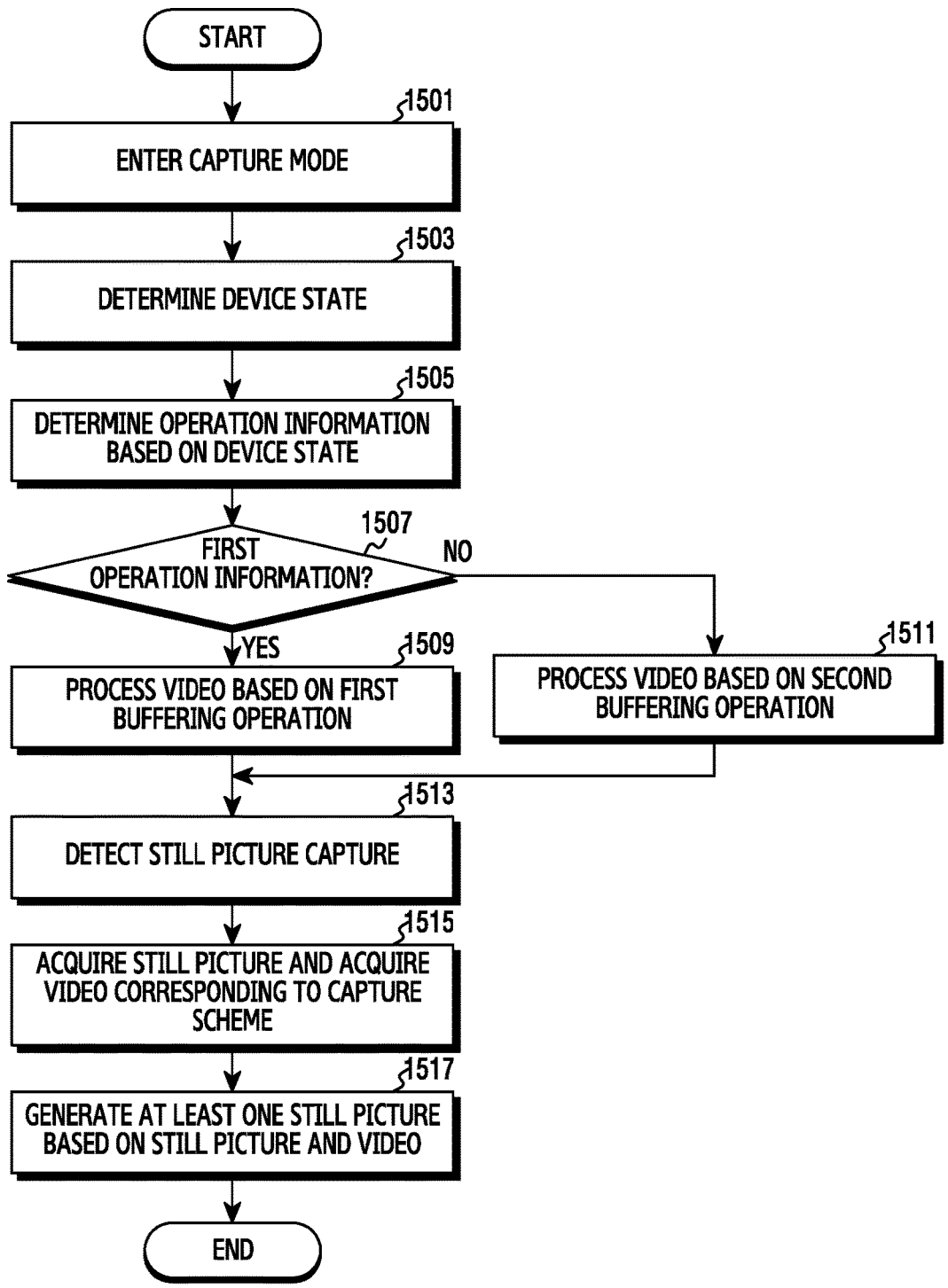
FIG. 15 is a flowchart illustrating an example data processing method in an electronic device according to various example embodiments of the present disclosure.

FIG. 15 is a flowchart illustrating an example data processing method in an electronic device according to various example embodiments of the present disclosure.

Referring to FIG. 15, when entering a capture mode in operation 1501, the controller 480 of the electronic device 400 may determine a device state in operation 1503. For example, the controller 480 may determine a state of the electronic device 400 on the basis of at least one of various conditions such as a size (capacity) of the memory 450 of the electronic device 400, electric current consumption of an encoder, image processing capability, a high-quality video capture, etc.

In operation 1505, the controller 480 may determine operation information based on the device state. For example, the controller 480 may determine first operation information or second operation information through a buffering scheme for storing a video, at least partially based on the determined device state. According to one example embodiment, the controller 480 may select the first operation information (e.g., the buffering scheme of FIG. 9) if a size (capacity) of the memory 450 included in the electronic device 400 is small (or an available storage space is less than a specific reference or threshold value) and electronic current consumption of the video encoder is small (e.g., less than a predetermined electronic current consumption value). According to another example embodiment, the controller 480 may select the second operation information (e.g., the buffering scheme of FIG. 10) if a size (capacity) of the memory 450 included in the electronic device 400 is large (or an available storage space is greater than or equal to a specific reference) and very small electronic current consumption is required.

Upon determining the first operation information by using the buffering scheme on the basis of the device state in operation 1507 (e.g., YES of operation 1507), the controller 480 may process a video based on a first buffering operation in operation 1509. For example, upon determining the first operation information, the controller 480 may operate to perform buffering by encoding a preview image, and to process the buffered preview image as a video as shown in the aforementioned examples of FIG. 9, FIG. 11, and FIG. 12. According to one example embodiment, the controller 480 may process the video by using a buffering scheme in which the preview image is first encoded and thereafter buffered.

Upon determining the second operation information using the buffering scheme based on the device state in operation 1507 (e.g., NO of operation 1507), the controller 480 may operate to process a video based on a second buffering operation in operation 1511. For example, upon determining the second operation information, the controller 480 may operate to perform buffering on only a YUV image included in a preview image, and to encode and process the buffered YUV image as a video. According to one example embodiment, the controller 480 may process the video by using a buffering scheme in which the YUV image included in the preview image is first encoded and thereafter buffered.

Upon detecting a still picture capture in operation 1513, the controller 480 may acquire (capture) a still picture and may acquire a video corresponding to a capture scheme in operation 1515. According to one example embodiment, the controller 480 may acquire an image (e.g., a preview image, a YUV image) corresponding to a specific time before a corresponding time point as a video for one still picture according to a first capture scheme on the basis of a capture time point of the still picture. According to another example embodiment, the controller 480 may acquire an image (e.g., a preview image, a YUV image) corresponding to a specific time before each time point as a video for one still picture according to a second capture scheme on the basis of a plurality of time points of capturing the still picture. For example, the controller 480 may independently acquire a video at every capture time point according to the capture interval time for capturing the still picture, or may generate one video until a time point at which a capture interval time is longer than a specific time, and concurrently acquire an image (e.g., a preview image, a YUV image) corresponding to a specific time before each time point from the generated video on the basis of the respective capture time points.

In operation 1517, the controller 480 may generate at least one still picture file based on the still picture and the video. According to an example embodiment, the controller 480 may generate one still picture file depending on one still picture and one video on the basis of the first capture scheme. According to another example embodiment, the controller 480 may collectively generate a plurality of still picture files depending on still pictures corresponding to respective capture time points and videos corresponding to respective still pictures on the basis of the second capture scheme. For example, the controller 480 may generate one or more jpeg files on the basis of a capture scheme (e.g., a typical first capture scheme in which a capture interval time is longer than a specific time, a second capture scheme in which a capture interval time is shorter than a specific time).

Figure 16:
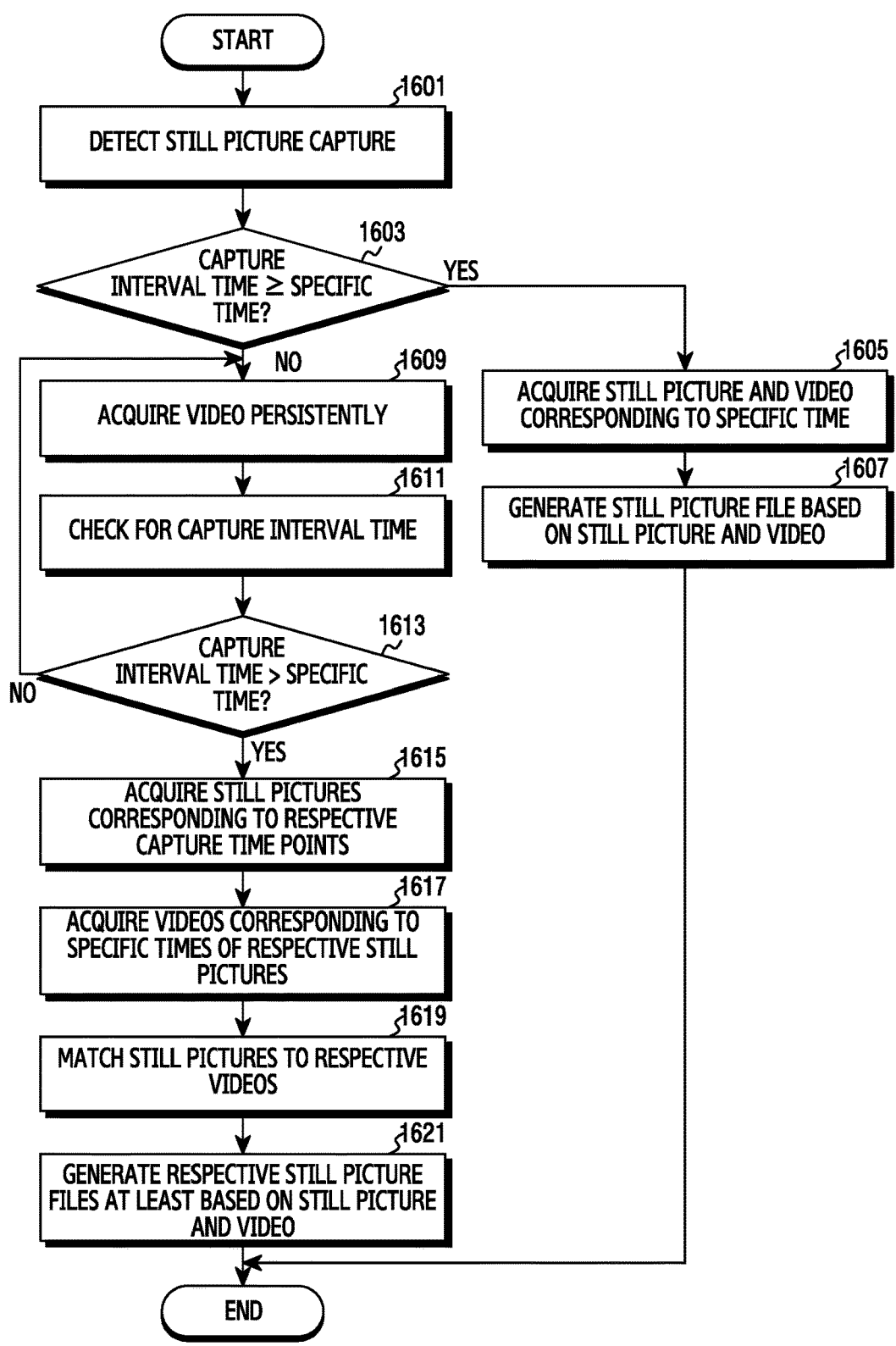
FIG. 16 is a flowchart illustrating an example operation of acquiring a video on the basis of a capture scheme in an electronic device according to various example embodiments of the present disclosure.

FIG. 16 is a flowchart illustrating an example operation of acquiring a video based on a capture scheme in an electronic device according to various example embodiments of the present disclosure.

Referring to FIG. 16, in operation 1601, the controller 480 of the electronic device 400 may detect a static picture capture. For example, the controller 480 may detect an operational instruction for capturing a still picture while a camera application is executed and a preview image is displayed through the display 431.

In operation 1603, the controller 480 may determine whether a capture interval time is longer than or equal to a specific time in response to detection of the still picture capture. For example, the controller 480 may determine whether the operational instruction for capturing the still picture is a normal capture based on a first capture scheme (e.g., the capture interval time ≥the specific time) or is a burst shot such as a continuous capture, a speed shot, or the like based on a second capture scheme (e.g., the capture interval time <the specific time).

If it is determined in operation 1603 that the capture interval time is longer than or equal to the specific time (YES of operation 1603), for example, if it is determined the a normal capture based on the first capture scheme, the controller 480 may acquire a still picture and a video corresponding to a specific time in operation 1605. According to one example embodiment, the controller 480 may acquire an image (e.g., a preview image, a YUV image) corresponding to a specific time before a corresponding time point on the basis of a time at which the still picture is captured based on the first capture scheme. For example, the controller 480 may independently acquire the video at every capture time point according to the capture interval time for capturing the still picture.

In operation 1607, the controller 4180 may generate a still picture file based on the still picture and the video. For example, the controller 480 may generate one still picture file depending on one still picture and one video based on the first capture scheme.

If it is determined in operation 1603 that the capture interval time is shorter than the specific time (NO of operation 1603), for example, if it is determined as a burst shot based on the second capture scheme, the controller 480 may persistently acquire a video in operation 1609. For example, the controller 480 may operate to persistently acquire the video until a time point at which the capture interval time is longer than the specific time on the basis of operation 1611 and operation 1613 described below.

The controller 480 may check for the capture interval time in operation 1611, and may determine whether the capture interval time is longer than the specific time in operation 1613. According to one example embodiment, the controller 480 may determine whether an operational instruction for capturing a still picture corresponding to the burst shot based on the second capture scheme is complete.

If it is determined in operation 1613 that the capture interval time is not longer than the specific time (NO of operation 1613), returning to operation 1609, the controller 480 may perform operations subsequent to operation 1609.

If it is determined in operation 1613 that the capture interval time is longer than the specific time (YES of operation 1613), the controller 480 may acquire still pictures corresponding to respective capture time points in operation 1615, and may acquire videos corresponding to specific times of respective still pictures in operation 1617. According to an example embodiment, the controller 480 may acquire an image (e.g., a preview image, a YUV image) corresponding to a specific time before each time point as a video for one still picture according to the second capture scheme on the basis of a plurality of time points of capturing the still picture. For example, the controller 480 may generate one video until a time point at which a capture interval time is longer than a specific time, and concurrently acquire an image (e.g., a preview image, a YUV image) corresponding to a specific time before each time point from the generated video on the basis of the respective capture time points.

The controller 480 may match still pictures to respective videos in operation 1619, and may generate respective still picture files based on the still pictures and the videos in operation 1621. For example, the controller 480 may collectively generate a plurality of still picture files depending on still pictures corresponding to respective capture time points and videos corresponding to respective still pictures on the basis of the second capture scheme.

Figure 17:
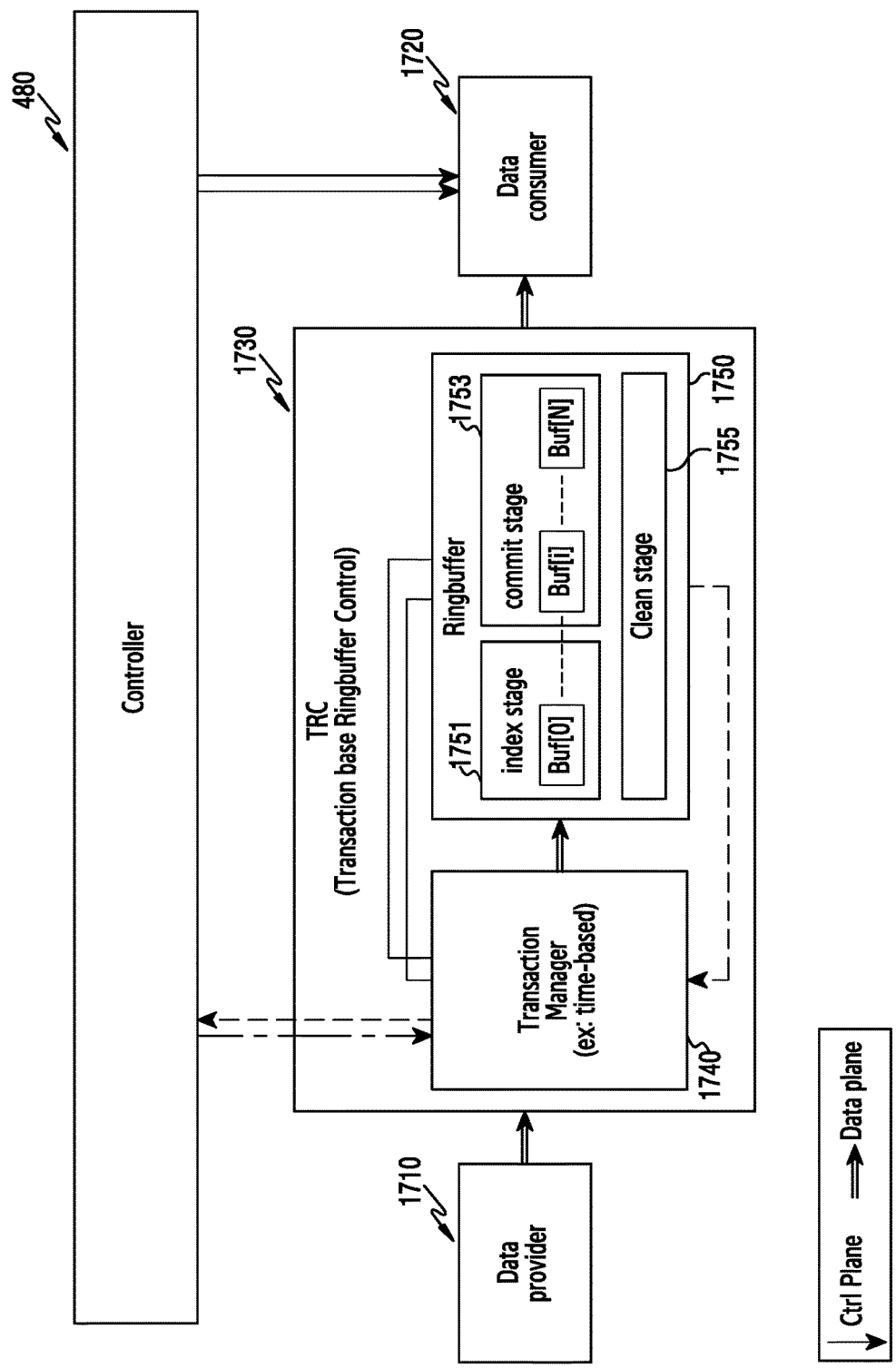
FIG. 17 is a diagram illustrating another example buffering operation in an electronic device according to various example embodiments of the present disclosure.
Figure 18:
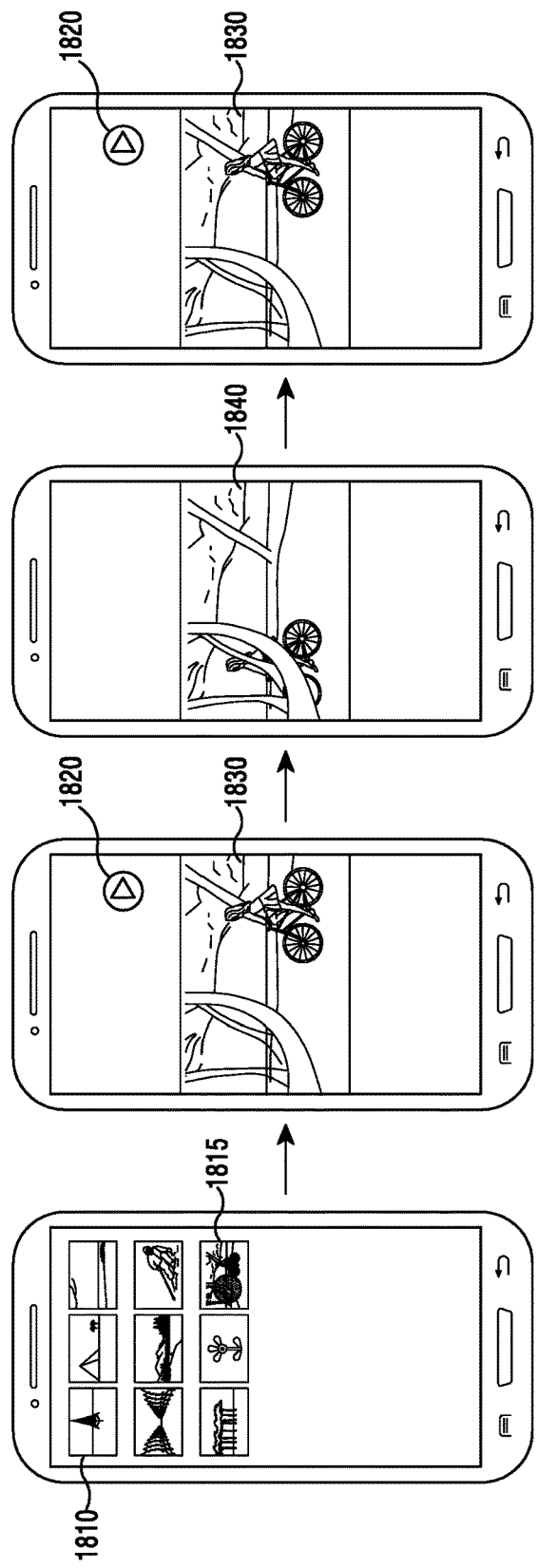
FIGS. 18A, 18B, 18C and 18D are diagrams illustrating an example of a screen for providing an image in an electronic device according to various example embodiments of the present disclosure.

FIG. 17 is a diagram illustrating another example buffering operation in an electronic device according to various example embodiments of the present disclosure.

Referring to FIG. 17, FIG. 17 illustrates another example of a buffering management operation for storing a video corresponding to a specific time before a capture time point in an electronic device. For example, FIG. 17 may illustrate a buffer control method for decreasing complexity in a fast continuous capture scheme. For example, in various example embodiments, a transaction manager 1740 is included so that a transaction is processed in the fast continuous capture scheme as illustrated in the aforementioned example of FIG. 12 or FIG. 14 based on the transaction manager 1740.

A data provider 1710 may refer, for example, to the encoder 1110 for encoding a preview image and providing an encoded image in the buffering structure of FIG. 9 and FIG. 12, and may indicate a YUV image included in a preview image in the buffering structure of FIG. 10 and FIG. 14.

A data consumer 1720 may refer, for example, to the Muxer 930 for storing a video in the buffering structure of FIG. 9 and FIG. 12, and may indicate the encoder 1110 for encoding and providing a buffered YUV image in the buffering structure of FIG. 10 and FIG. 14.

A Transaction Base Ring buffer Control (TRC) block 1730 may refer, for example, to the buffer 1120 and a block for a buffering control of the buffer 1120 in the buffering structure of FIG. 9 and FIG. 10 and the buffering structure of FIG. 10 and FIG. 14. For example, the TRC 1730 may include the transaction manager 1740 and a buffer 1750 (e.g., a ring buffer). According to one example embodiment, the buffer 1750 may include an index stage 1751, a commit stage 1753, and a clean stage 1755. In various example embodiments, the TRC 1730 may include the transaction manager 1740, and may process a transaction in the aforementioned fast continuous capture scheme on the basis of the transaction manager 1740 instead of the controller 480.

Referring to FIG. 17, the transaction manager 1740 may manage data (e.g., an encoded image or a YUV image) buffered in the buffer 1750 in unit of a transaction on the basis of a proper event generation interval. The transaction manager 1740 may manage a life cycle (e.g., a transaction start/stop) of the transaction by processing scheduling on one or a plurality of stages (e.g., the index stage 1751, the commit stage 1753, and the clean stage 1755. For example, the transaction manager 1740 may perform scheduling on one or more stages 1751, 1753, and 1755 of the buffer 1750 to synchronize a life cycle (e.g., a transaction start/stop) of a transaction of the buffer 1750 and a life cycle (e.g., a transaction start/stop) of the data consumer 1720.

According to various example embodiments, in response to a trigger signal (e.g., each trigger signal based on a continuous operational instruction for the still picture capture of FIG. 12 or FIG. 14) from the controller 480, the transaction manager 1740 may divide an encoded preview image delivered from the encoder 1110 or a YUV image delivered from the camera module 470 in unit of transaction (e.g., each operational instruction unit based on a burst shot). For example, the controller 480 may deliver the trigger signal based on the operational instruction (e.g., operations 1201 to 1211 of FIG. 12 or operations 1401 to 1411 of FIG. 14) to the transaction manager 1740 and the data consumer 1720.

The transaction manager 1740 may manage an image (e.g., a preview image or a YUV image) buffered in the buffer 1750 on the basis of an event occurrence interval based on the trigger signal in unit of transaction, and may assign an index (e.g., a transaction start or a transaction stop as a time point of dividing a video) to the buffered image in unit of transaction in the index stage 1751 to commit in the commit stage 1753. According to one example embodiment, the commit stage 1753 performs an operation of sorting orders of mixed images so as to be viewed in the same order as those viewed finally to a user.

The data consumer 1720 (e.g., the media splitter 950, the encoder 1110) may start a task (e.g., an operation related to video generation) in response to the trigger signal.

Upon determining a last transaction (e.g., if there is no more trigger signal after a final trigger signal is received according to a final operational instruction), the transaction manager 1740 may deliver an End Of Transaction (EOT) notification to the controller 480. The controller 480 may deliver the trigger signal to the data consumer 1720 in response to the EOT notification of the transaction manager 1740. The data consumer 1720 may stop the task in response to the trigger signal of the controller 480.

According to various example embodiments, the data consumer 1720 may confirm a time point of dividing a video on the basis of the index assigned to the buffered image, and may process a task (e.g., video generation or encoding for each still picture) related to video generation corresponding to each still picture on the basis of the time point of divided the video. As such, in various example embodiments, a life cycle (e.g., a transaction start/stop) of the data consumer 1720 may be synchronized with a life cycle of a transaction on the basis of the transaction manager 1740, so that a computation complexity of the controller 480 is decreased and a fast buffer control is possible in comparison with a transaction managed by the controller 480.

Various example embodiments in which an electronic device simultaneously stores a still picture and a video by combining as a still picture file (e.g., a jpeg file) are described above. Hereinafter, an operation of reproducing by the electronic device the still picture file in which the still picture and the video are combined will be described.

FIGS. 18A, 18B, 18C and 18D are diagrams illustrating an example of a screen for providing an image in an electronic device according to various example embodiments of the present disclosure.

FIG. 18A may illustrate an example of displaying a list of images (e.g., a still picture, a video, etc.) stored in the electronic device 400. According to one example embodiment, the list of images may be provided, for example, as a thumbnail image 1810 of each image. According to various example embodiments, the list may be provided on the basis of at least one of a text or a thumbnail image, or may be provided in various structures such as a matrix type or an enumeration type.

In a state where a list is displayed as illustrated in the screen of FIG. 18A, a user may select (e.g., touch) a specific thumbnail image 1815 from a list for displaying (or reproducing) a specific image. In the example of FIG. 18A, an image selected by the user is a thumbnail image of a still picture file in which a still picture and a video are combined.

The electronic device 400 may display (reproduce) an image corresponding to the selected thumbnail image 1815 as illustrated in FIG. 18B and FIG. 18C in response to a user selection. For example, if the selected image is a still picture file including a still picture and a video, the electronic device 400 may extract a still picture part from the still picture file to display a still picture 1830 as illustrated in FIG. 18B. In various example embodiments, the electronic device 400 may provide a video guide item 1820 to any one side of the screen to guide that the displayed still picture 1830 is an image including the video. For example, the video guide item 1820 may indicate that a related video is further included after the still picture 1830.

After displaying the still picture 1830 as illustrated in FIG. 18B, the electronic device 400 may subsequently reproduce and display a video 1840 related to the still picture 1830 as illustrated in FIG. 18C. For example, the electronic device 400 may provide the screen illustrated in FIG. 18C of the video 1840 by automatically switching from the screen of FIG. 18B of the still picture 1830. According to various example embodiments, the video 1840 may refer, for example, to a video corresponding to a specific time before or after a capture time point of the still picture 1830. According to various example embodiments, on the basis of an option (e.g., a configuration for a display type of the still picture and the video) configured in the electronic device 400, the screen illustrated in FIG. 18B of the still picture 1830 may be switched to the screen illustrated in FIG. 18C for reproducing and displaying the video 1840 under the selection of the video guide item 1820. For example, the screen illustrated in FIG. 18C of the video 1840 may be provided by manually switching from the screen B of the still picture 1830.

After displaying the video 1840 as illustrated in FIG. 18C, the electronic device 400 may display the still picture 1830 as illustrated in FIG. 18D upon completion of the reproducing of the video 1840. In various example embodiments, the screen illustrated in FIG. 18D and the screen illustrated in FIG. 18B indicate the same screen, and the screen illustrated in FIG. 18D is illustrated for convenience of explanation. For example, upon completion of the reproducing of the video 1840, the electronic device 400 may display the screen by automatically switching to the screen (e.g., the screen illustrated in FIG. 18B or FIG. 18C) of the still picture 1830 before the reproducing of the video 1840.

Figure 19:
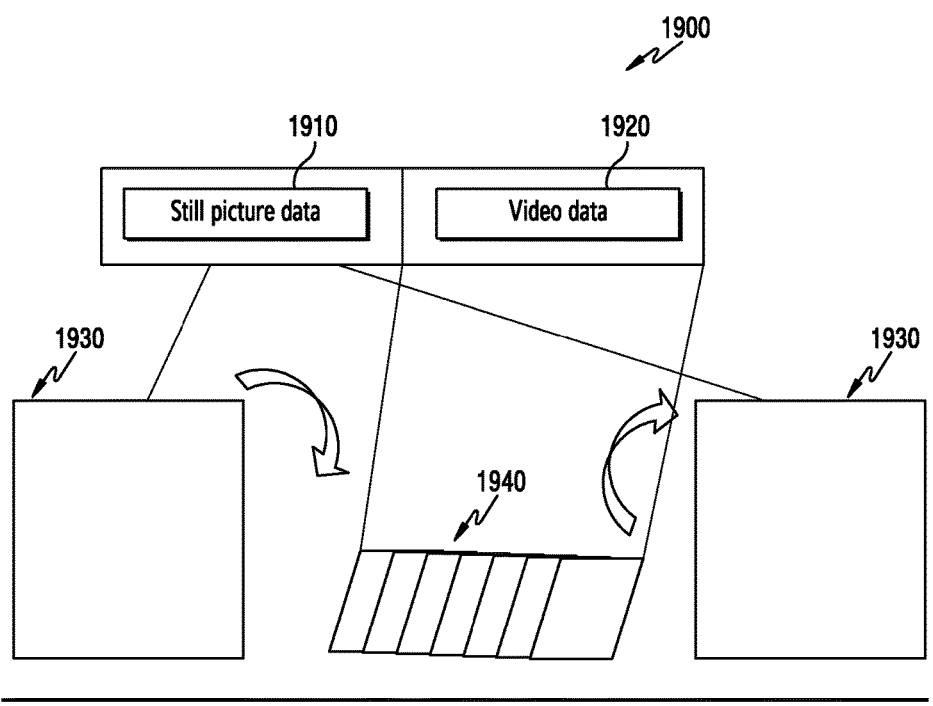
FIG. 19 is a diagram illustrating an example operation of providing a video in an electronic device according to various example embodiments of the present disclosure.

FIG. 19 is a diagram illustrating an example operation of providing a video in an electronic device according to various example embodiments of the present disclosure.

FIG. 19 illustrates an example operation of reproducing and displaying a still picture file (e.g., a jpeg file) in which a static picture and a video are combined.

Referring to FIG. 19, a still picture file 1900 may be divided into still picture data 1910 and video data 1920, and for example, may be generated as a jpeg file. The electronic device 400 may display a still picture 1930 of a part of the still picture data 1910 from the still picture file 1900 through the display 431.

After displaying the still picture 1930, the electronic device 400 may reproduce a video 1940 of a part of the video data 1920 in the still picture file 1900 so as to be displayed through the display 431, based on an auto type or a manual type. For example, the electronic device 400 may analyze a start location and an end location of the video data 1920 through the file analyzing unit 531, and may reproduce the video 1940 through the video reproducing unit 533 by moving to the start location from a corresponding location.

When the reproducing of the video 1940 is complete, for example, when the reproducing of the video 1940 is complete until the end location of the video data 1920, the electronic device 400 may display again the still picture 1930 through the display 431 by moving to a part (location) of the static picture data 1910 of the still picture file 1900.

Figure 20:
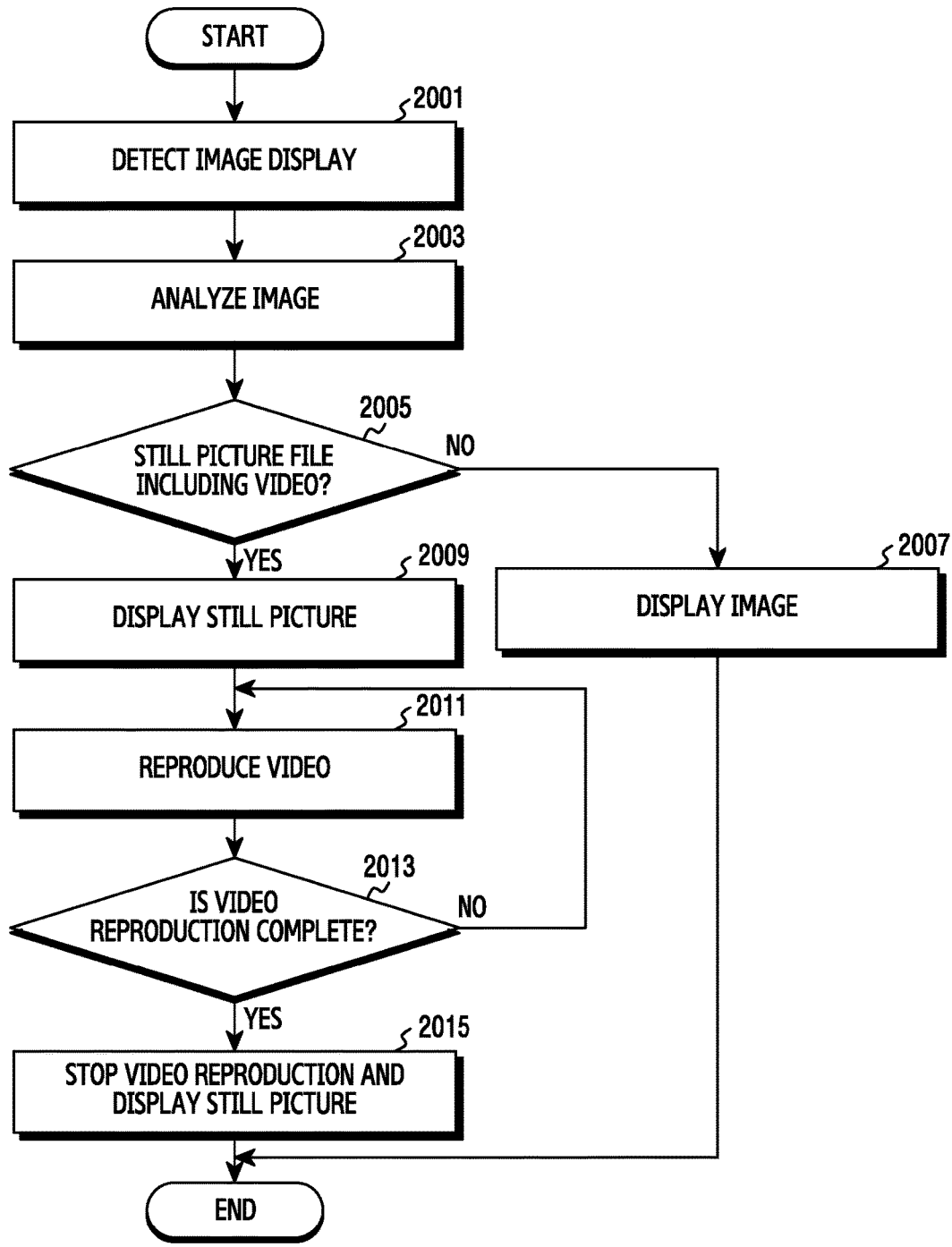
FIG. 20 is a flowchart illustrating an example method of providing an image in an electronic device according to various example embodiments of the present disclosure.

FIG. 20 is a flowchart illustrating an example method of providing an image in an electronic device according to various example embodiments of the present disclosure.

Referring to FIG. 20, in operation 2001, the controller 480 of the electronic device 400 may detect an image display. For example, as described above with reference to FIG. 18, if a specific image is selected by a user from a list of images, the controller 480 may determine this as an input for the image display.

The controller 480 may analyze a selected image in operation 2003 in response to the detection of the image display, and may determine whether the selected image is a still picture file including video in operation 2005. For example, the controller 480 may determine an image type. According to various example embodiments, the image type may include a still picture, a video, an image in which the still picture and the video are combined (e.g., a still picture file), or the like.

If it is determined in operation 2005 that the selected image is not the still picture file including the video (NO of operation 2005), the controller 480 may display a corresponding image in operation 2007. For example, the controller 480 may display the still picture through the display 431 if the selected image is the still picture, and may reproduce the video to be displayed through the display 431 if the selected image is the video.

If it is determined in operation 2005 that the selected image is the still picture file including the video (YES of operation 2005), the controller 480 may display the still picture in operation 2009. For example, the controller 480 may extract a part corresponding to the still picture from the still picture file to display the still picture on the display 431. According to one example embodiment, if it is determined that the selected image is the still picture file, the controller 480 may distinguish a still picture part and a video part from the still picture file, and may analyze a start point (location) and an end point (location) of the video part.

In operation 2011, the controller 480 may reproduce the video after displaying the still picture. For example, the controller 480 may reproduce the video by moving to a video start point in the still picture file. According to one example embodiment, after displaying the still picture, the controller 480 may automatically reproduce the video from a start point of the video to be displayed on the display 431. According to various example embodiments, after displaying the still picture, the controller 480 may reproduce the video from the start point of the video to be displayed on the display 431, on the basis of a selection of the video guide item 1820 of a user.

In operation 2013, the controller 480 may determine whether the video is completely reproduced. For example, the controller 480 may determine whether an end point of the video reaches (e.g., a video is completely reproduced) during the video is reproduced.

If the video is not completely reproduced in operation 2013 (NO of operation 2013), the controller 480 may perform operation 2011 and its subsequent operations.

If the video is completely reproduced in operation 2013 (YES of operation 2013), the controller 480 may stop the reproducing of the video and may display the still picture in operation 2015. For example, the controller 480 may display the still picture before the reproducing of the video.

Figure 21:
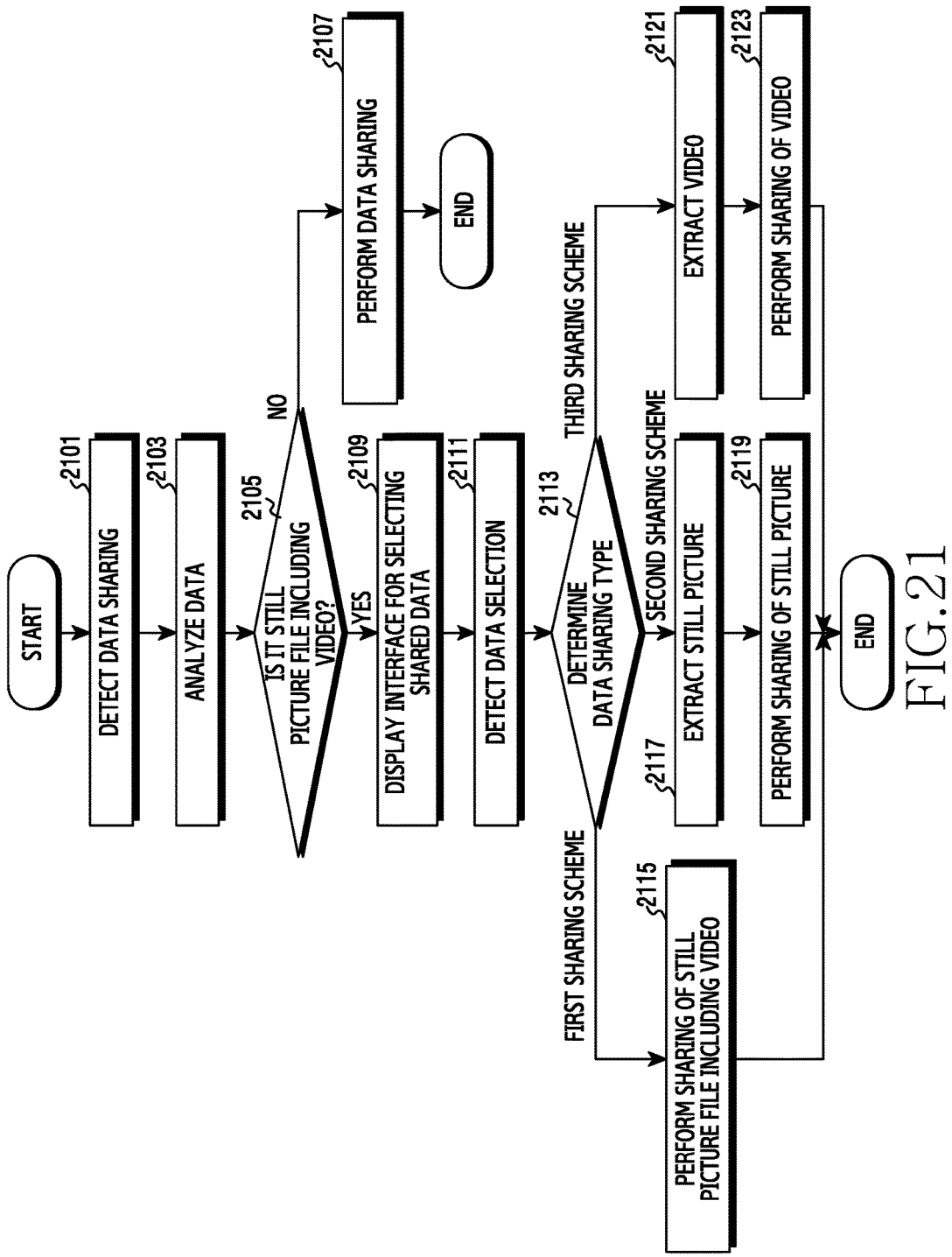
FIG. 21 is a flowchart illustrating an example operation of sharing data in an electronic device according to various example embodiments of the present disclosure.

FIG. 21 is a flowchart illustrating an example operation of sharing data in an electronic device according to various example embodiments of the present disclosure.

Referring to FIG. 21, in operation 2101, the controller 480 of the electronic device 400 may detect data sharing. For example, the controller 480 may determine the data sharing on the basis of a user input for sharing a specific image during a list of images is displayed or various Social Network Services (SNSs) are executed.

The controller 480 may analyze data in operation 2103, and may determine whether a type of data is a still picture file including a video in operation 2105. For example, the controller 480 may analyze a type of data requested to be shared by the user (e.g., data selected for sharing). According to various example embodiments, the data may include a still picture, a video, an image in which the still picture and the video are combined (e.g., a still picture file), or the like.

If it is determined in operation 2105 that the data is not the still picture file including the video (NO of operation 2105), the controller 480 may perform sharing of the data in operation 2107. For example, if the data is the still picture or the video, the controller 480 may transmit the still picture or the video to another device (e.g., the electronic device 102 or 104, the server 106) through a communication circuit (e.g., the wireless communication unit 410).

If it is determined in operation 2105 that the data is the still picture file including the video (YES of operation 2105), the controller 480 may display an interface for selecting the shared data in operation 2109. For example, the controller 480 may allow to display a GUI (e.g., a popup window) on the display 431 to determine (or select) whether to share the still picture file including the still picture and the video, whether to share only the still picture in the still picture file, or whether to share only the video in the still picture file.

In operation 2111, the controller 480 may detect data selection on the basis of the interface for selecting the shared data. For example, the user may select any one of the still picture file, the still picture, and the video through the interface for selecting the shared data.

In operation 2113, the controller 480 may determine a data sharing type. For example, the controller 480 may determine any one sharing scheme based on selected data among a first sharing scheme for sharing the still picture file including the video, a second sharing scheme for sharing only the still picture in the still picture file, and a third sharing scheme for sharing only the video in the still picture file. The controller 480 may perform an operation for sharing related data on the basis of the data sharing scheme.

According to one example embodiment, if it is determined in operation 2113 that the data sharing type is the first sharing scheme, the controller 480 may perform the sharing of the still picture file including the video in operation 2115. For example, the controller 480 may transmit the still picture file to another device (e.g., the electronic device 102 or 104, the server 106) through a communication circuit (e.g., the wireless communication unit 410).

According to one example embodiment, if it is determined in operation 2113 that the data sharing type is the second sharing scheme, the controller 480 may extract the still picture from the still picture file in operation 2117. For example, the controller 480 may distinguish a still picture part and a video part from the still picture file, and may extract the still picture part from the still picture file. In operation 2119, the controller 480 may perform sharing of the still picture. For example, the controller 480 may transmit the still picture to another device (e.g., the electronic device 102 or 104, the server 106) through the communication circuit (e.g., the wireless communication unit 410).

According to one example embodiment, if it is determined in operation 2113 that the data sharing type is the third sharing scheme, the controller 480 may extract the video from the still picture file in operation 2121. For example, as described above, the controller 480 may distinguish a still picture part and a video part from the still picture file, and may extract the video part from the still picture file. In operation 2123, the controller 480 may perform sharing of the video. For example, the controller 480 may transmit the video to another device (e.g., the electronic device 102 or 104, the server 106) through the communication circuit (e.g., the wireless communication unit 410).

In the aforementioned various example embodiments, the still picture file is generated on the basis of the still picture and the video or connectivity information of the still picture and the video in the electronic device. Hereinafter, an operation of minimizing and/or reducing a speed delay between capture intervals (e.g., shot-to-shot) of the still picture is described according to various example embodiments.

For example, conventionally, since a still picture and a video are synchronously processed when stored together in one file, the still picture can be re-captured starting from a time point at which the storing of the video is complete, and thus a time may be delayed between captures. In various example embodiments, asynchronous processing may be performed by splitting a pipeline for processing the still picture and a pipeline for performing video recording. Accordingly, in various example embodiments, the conventional image capture sequence may be improved so that the still picture and the video are stored as one resultant image without causing a delay in a still picture capture speed.

Figure 22:
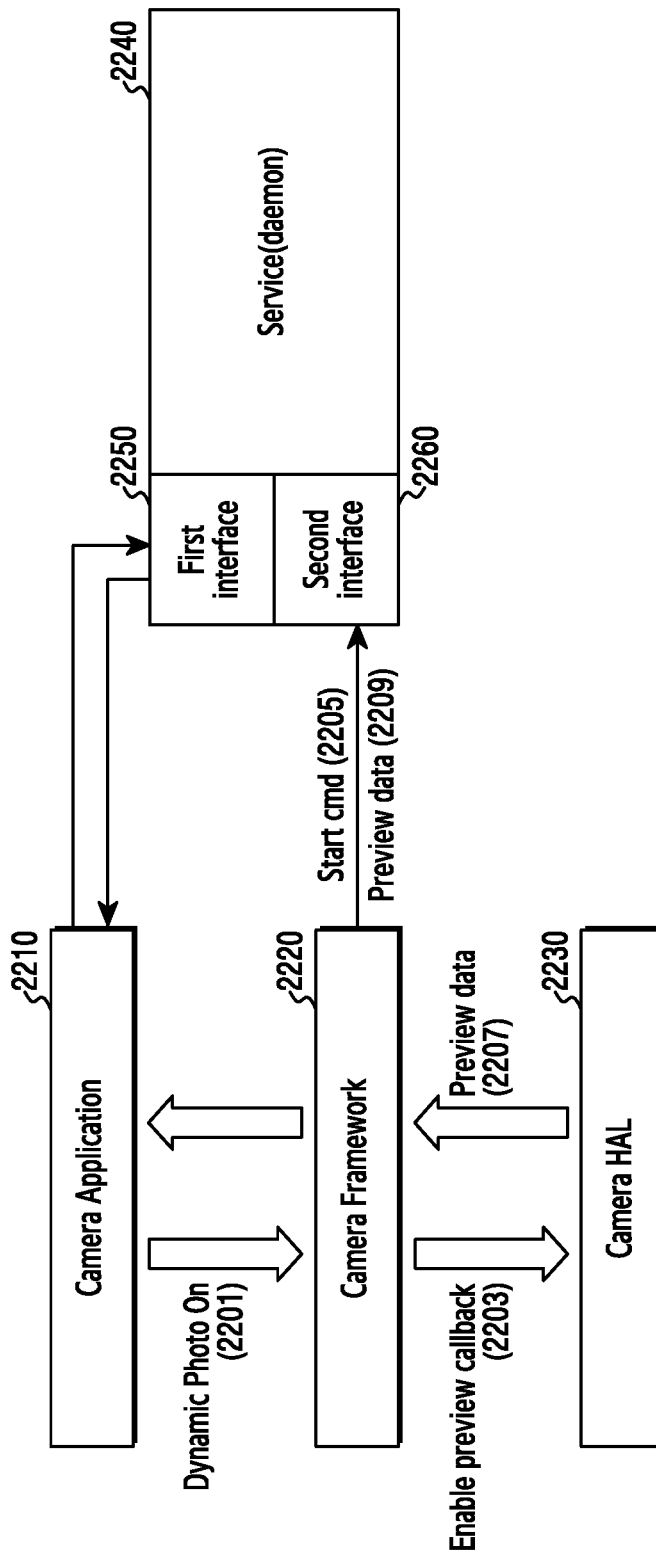
FIG. 22, FIG. 23, and FIG. 24 are diagrams illustrating an example asynchronous processing operation of an image in an electronic device according to various example embodiments of the present disclosure.
Figure 23:
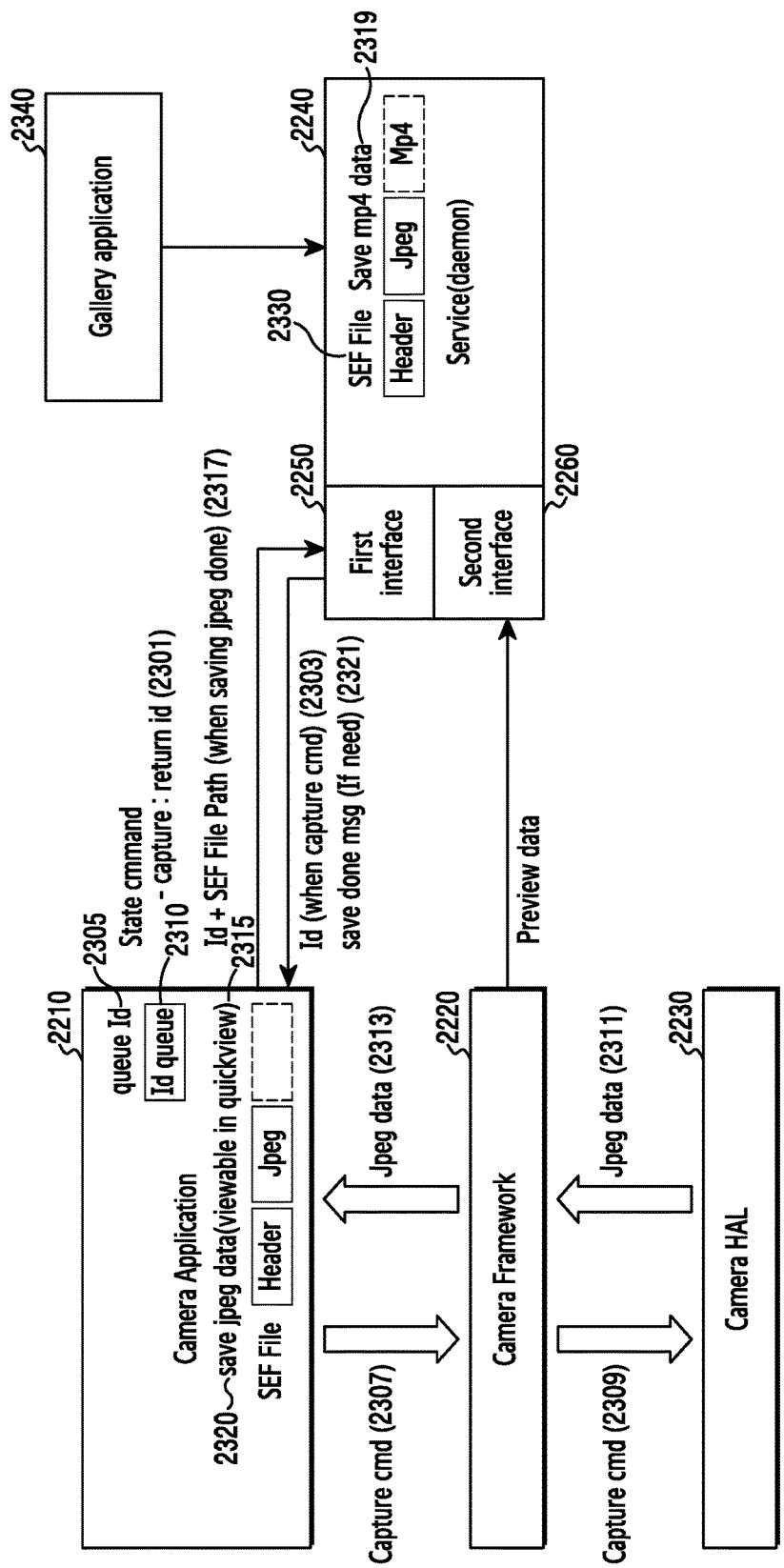
Figure 24:
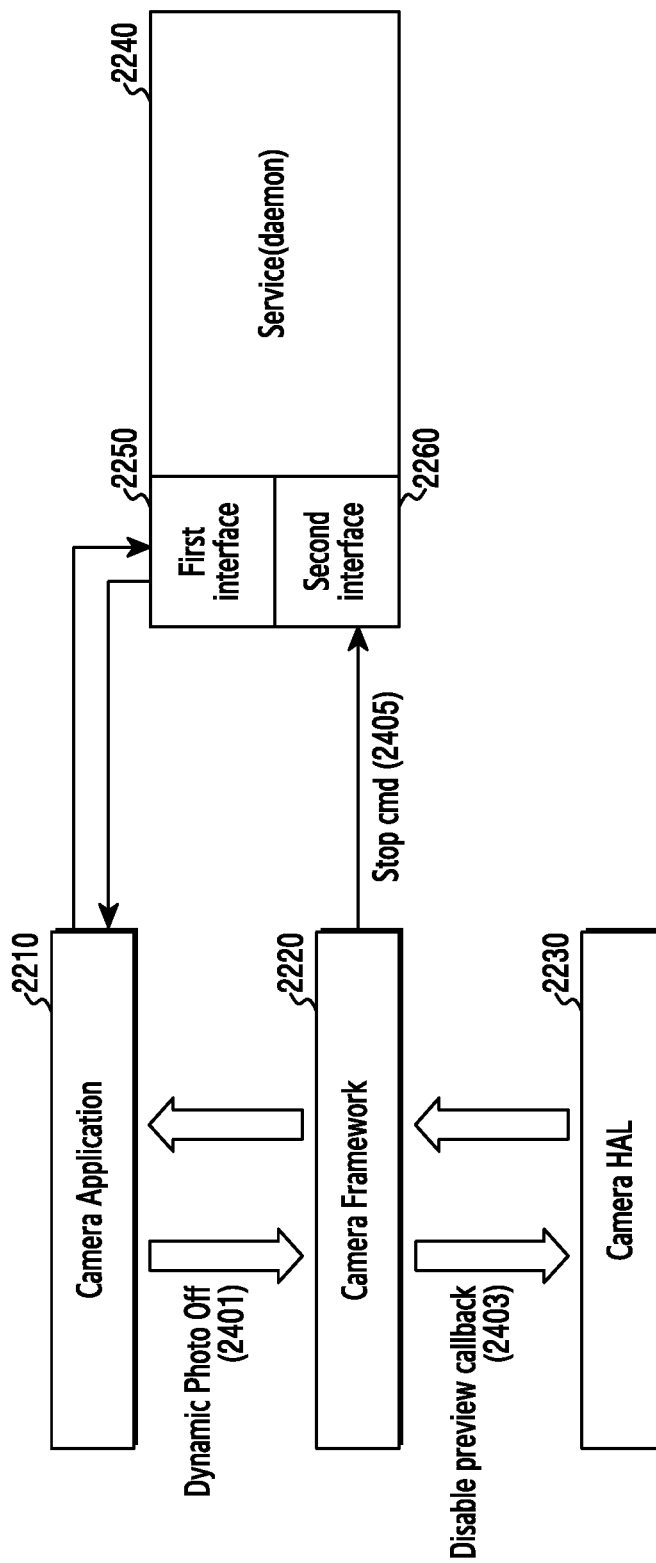

FIG. 22, FIG. 23, and FIG. 24 are diagrams illustrating an example asynchronous processing operation of an image in an electronic device according to various example embodiments of the present disclosure.

An example of a camera program module of the electronic device 400 may be illustrated in FIG. 22, FIG. 23, and FIG.

24. In various example embodiments, for example, the camera program module may include all or some parts of the program module 310 of FIG. 3. For example, the electronic device 400 may include a camera application 2210, a camera framework 2220, a camera Hardware Abstraction Layer (HAL, hereinafter simply referred to as a "camera HAL") 2230, and a service daemon 2240.

As an application of an uppermost level of the camera program module (e.g., the camera 375 of the application 370 of FIG. 3), the camera application 2210 may play a role of opening and managing a camera to use a camera (e.g., the camera module 470) of the electronic device 400.

The camera framework 2220 may call a camera-related library, for example, by means of a runtime (e.g., the runtime library 335 of the middle ware 330 of FIG. 3), and may be connected to the camera HAL 2230 through binder communication in the library to operate the camera.

As an abstract layer of a real camera interface, the camera HAL 2230 may include a camera hardware module which is loaded directly above a real camera device driver (e.g., the device driver 323 of the kernel 320 of FIG. 3).

The service daemon 2240 may perform a service for an operation requested by the camera application 2210 or the camera framework 2220 (e.g., the library). According to various example embodiments, the service daemon 2240 may correspond to the video recording engine 900 of FIG. 9 or FIG. 10. The service daemon 2240 may include a first interface 2250 (e.g., a java interface) for communication with the camera application 2210 and a second interface 2260 (e.g., a native interface) for communication with the camera framework 2220.

FIG. 22 illustrates an example of providing a preview image (e.g., dynamic photo on) when a capture operation starts in the electronic device 400.

Referring to FIG. 22, in operation 2201, the camera application 2210 may deliver an operational instruction (e.g., dynamic photo on) for outputting a preview image, in response to an execution of the camera application 2210.

In operation 2203, the camera framework 2220 may request (e.g., enable) the camera HAL 2230 for the preview call (e.g., the preview callback).

In operation 2205, the camera framework 2220 may notify to the service daemon 2240 that a preview operation starts in parallel or in sequence at the request of the preview call. For example, the camera framework 2220 may deliver a start command to the service daemon 2240 through the second interface 2260 (e.g., the native interface).

In operation 2207, the camera HAL 2230 may call and deliver preview data to the camera framework 2220, in response to the request of the preview call (e.g., the preview callback) of the camera framework 2220.

In operation 2209, the camera framework 2220 may deliver the preview data to the service daemon 2240 upon receiving the preview data from the camera HAL 2230. For example, the camera framework 2220 may deliver the preview data to the service daemon 2240 through the second interface 2260.

According to various example embodiments, the service daemon 2240 may store in a buffer (e.g., buffering) the preview data delivered from the camera framework 2220. According to one embodiment, the service daemon 2240 may perform an operation corresponding to the aforementioned video recording engine 900 of FIG. 9 or FIG. 10.

FIG. 23 illustrates an example of performing an image capture (e.g., a capture) in the electronic device 400.

Referring to FIG. 23, in operation 2301, the camera application 2210 may deliver a state command to the service daemon 2240 in response to an operational instruction for performing the image capture. For example, the camera application 2210 may deliver a start of the image capture to the service daemon 2240 through the first interface 2250 (e.g., the java interface). Upon confirming the start of the capture from the camera application 2210, the service daemon 2240 may start encoding to generate a recording file by using the preview data stored (buffered) in a buffer.

In operation 2303, when the start of the capture is notified by the camera application 2210, in this case, the service daemon 2240 may generate an IDentification (ID) so that each capture is managed, and may deliver it to the camera application 2210 on the basis of the first interface 2250. According to various example embodiments, the service daemon 2240 may deliver the ID for each capture to the camera application 2210, and may manage a corresponding capture by using the ID for each capture at a later time, thereby being able to prevent a problem which may occur in an overlapping or continuous capture.

In operation 2305, the camera application 2210 may manage an ID received from the service daemon 2240 by registering the ID to a queue 2310.

In operation 2307, the camera application 2210 may deliver a capture command to the camera framework 2220.

In operation 2309, upon receiving the capture command from the camera application 2210, the camera framework 2220 may confirm a current state, and if the capture is possible, may deliver the capture command to the camera HAL 2230.

In operation 2311, the camera HAL 2230 may deliver image data (e.g., jpeg data) generated according to the capture to the camera framework 2220. According to various example embodiments, when the image data is delivered to the camera framework 2220, the camera HAL 2230 may deliver an address on the memory 450 in which the image data is stored without having to copy the image (e.g., delivering of real image data).

In operation 2313, the camera framework 2220 may deliver to the camera application 2210 image data delivered from the camera HAL 2230.

In operation 2315, upon receiving the image data from the camera framework 2220, the camera application 2210 may store the image data in a file 2320 (e.g., a System Edit File (SEF)). According to various example embodiments, the camera application 2210 may generate a header of the SEF 2320, store up to image data (e.g., jpeg) in the SEF 2320, and complete a task of adding the image data to a DataBase (DB). As a result, in this state, the captured image data can be directly confirmed in a gallery application 2340.

In operation 2317, the camera application 2210 may deliver a file path (e.g., a path of the SEF 2320) for storing the image data to the service daemon 2240 through a first interface (e.g., a java interface).

In operation 2319, upon receiving a file path at which the image data is stored (e.g., the path of the SEF 2320) from the camera application 2210, the service daemon 2240 may add encoded video data (e.g., mp4) to an end part of the file 2320 (e.g., after image data (e.g., jpeg)), and may generate and store the file 2330 including the image data (still picture) and the video.

In operation 2321, if a file 2330 is optionally stored, the service daemon 2240 may deliver to the camera application 2210 and the gallery application 2340 a message indicating that the file 2330 is completely stored (e.g., a save done message). According to various example embodiments, not only a still picture (e.g., jpeg) but also a video (e.g., mp4) may be processed to be visible to a user.

FIG. 24 illustrates an example of ending a capture operation (e.g., dynamic photo off) in the electronic device 400.

Referring to FIG. 24, in operation 2401, the camera application 2210 may deliver an operational instruction (e.g., dynamic photo off) for stopping the capture operation to the camera framework 2220.

In operation 2403, the camera framework 2220 may cancel (e.g., disable) a preview call (e.g., a preview callback) on the camera HAL 2230.

In operation 2405, upon cancelling the preview call, the camera framework 2220 may notify to the service daemon 2240 that a capture operation (e.g., dynamic photo) ends in sequence or in parallel. For example, the camera framework 2220 may deliver a stop command to the service daemon 2240 through the second interface 2260 (e.g., the native interface).

As described above with reference to FIG. 22, FIG. 23, and FIG. 24, according to various example embodiments, while processing a capture pipeline for a still picture as a main operation, only providing of preview data to the service daemon 2240 (or a background service) (e.g., corresponding to the video recording engine 900 of FIG. 9 or FIG. 10) for recording a video may be performed. For example, a recording pipeline for the video may be processed in an asynchronous manner by splitting from the capture pipeline.

According to various example embodiments, the service daemon 2240 may be allowed to store corresponding preview data in a buffer, and to generate the preview data buffered in the buffer as recording content (e.g., mp4) only when an image is captured.

According to various example embodiments, at the same time of completely generating captured image data (e.g., a jpeg file), the service daemon 2240 may immediately register it to the gallery application 2340 so that the user can immediately confirm corresponding image data through a gallery or a viewer, thereby completely adding the image data and database.

According to various example embodiments, the still picture and the video can be directly subjected to a continuous capture through asynchronous processing (or split processing), thereby minimizing a speed delay also in a capture such as a burst shot or the like.

According to various example embodiments, the recording content (e.g., mp4) may be provided as a payload to image data (e.g., jpeg), and thus may be generated and managed as one file.

As described above with reference to FIG. 22, FIG. 23, and FIG. 24, an image capture method according to various example embodiments may include, for example, performing buffering through video recording and a buffering service (e.g., a service daemon or a background service) when a user input is achieved to display a preview (or to execute a camera application), generating a capture IDentifier (ID) based on a capture command for an image capture and delivering it to the buffering service, storing a still picture corresponding to the capture command in association with the capture ID, upon completing of the generating of the still picture, performing encoding (e.g., mp4) on the video, and storing a video encoded at the same time of the still picture through the buffering service by the use of the delivered capture ID by adding to the still picture.

As described above, the electronic device 400 according to various example embodiments may perform acquiring an image through the camera module 470 in response to entering a capture mode, displaying the acquired image as a preview image through the display 431, acquiring a still picture from the image in response to an operational instruction for capturing the still picture, acquiring a video from at least one part of the preview image, generating a still picture file of an image format on the basis of the still picture and a video, and storing the still picture file in the memory 450.

According to various example embodiments, the acquiring of the video may include buffering at least one part of the preview image, and generating the video on the basis of an image corresponding to a specific time before or after a time point of an operational instruction from the buffered preview image in response to the operational instruction.

According to various example embodiments, the buffering may include determining a device state upon entering the capture mode, determining a buffering type for storing the video at least partially based on the device state, processing the video on the basis of a first buffering operation if first operation information is determined with the buffering type, and processing the video on the basis of a second buffering operation if second operation information is determined with the buffering type.

According to various example embodiments, the determining of the device state may include determining the device state at least partially based on a size of the memory, electric current consumption of an encoder, image processing capability, or a high-resolution video capture.

According to various example embodiments, the determining may include determining the first operation information if the size of the memory is small (e.g., less than a predetermined memory size threshold value) and electric current consumption of the encoder is low (e.g., lower than a predetermined electric current consumption threshold value), and determining the second operation information if the size of the memory is great and low power is required.

According to various example embodiments, the processing of the video may include generating the video on the basis of a buffering type in which the preview image is first encoded and thereafter buffered if the first operation information is determined, and generating the video on the basis of a buffering type in which a YUV image included in the preview image is first buffered and thereafter encoded if the second operation information is determined.

According to various example embodiments, the method may include acquiring the still picture upon detecting an operational instruction for capturing the still picture, and acquiring independently or collectively the video corresponding to the still picture on the basis of a capture scheme corresponding to the operational instruction.

According to various example embodiments, the acquiring may include determining whether it is a normal capture based on a first capture scheme or a burst shot based on a second capture scheme in response to an operational instruction for capturing the still picture at least partially based on a capture interval time and a specific time, upon determining the first capture scheme, acquiring an image corresponding to a specific time before a corresponding time point as a video for one still picture on the basis of a time point of capturing the still picture, and generating a sill picture file on the basis of the still picture and the video, and upon determining the second capture scheme, acquiring persistently one video until a time point at which the capture interval time is longer than the specific time, acquiring from the video an image corresponding to a specific time before each time point on the basis of a plurality of time points for capturing the still picture as videos corresponding to respective still pictures, and generating a plurality of still picture files on the basis of the respective still pictures and the respective videos.

According to various example embodiments, the method may further include detecting an input for displaying the still picture file stored in the memory, dividing a still picture part and a video part from the still picture file, displaying the still picture by extracting the still picture part from the still picture file, reproducing and displaying the video at a start location of the video part from the still picture file after displaying the still picture, and displaying the still picture upon completion of the reproducing of the video.

According to various example embodiments, the reproducing and displaying of the video may include reproducing and displaying automatically the video after displaying the still picture, or reproducing or displaying the video in response to a selection of a video guide item.

According to various example embodiments, the method may further include detecting an input for sharing a still picture file stored in the memory, determining a sharing scheme on the basis of an interface for selecting the sharing scheme of the still picture file, and sharing selectively the still picture file, a still picture of the still picture file, or a video of the still picture file in response to the determined sharing scheme.

An electronic device and an operation method thereof according to various example embodiments can provide various experiences to a user since the user can simultaneously acquire a still picture and a video corresponding to a specific time before a still picture capture with the same experience as a typical photographing experience. According to various example embodiments, when the still picture capture is achieved by the user, the still picture and the video are generated and stored at one still picture file (e.g., a jpeg file), and the still picture of the still picture file and the video related to the still picture are provided together, thereby providing various experiences to the user.

According to various example embodiments, asynchronous processing can be provided in which a pipeline for processing a still picture and a pipeline for performing video recording are split. Therefore, in various example embodiments, a speed delay between image captures can be minimized. The conventional image capture sequence can be improved to provide a fast image capture performed by a user without causing a delay of an image capture speed. The still picture and the video can rapidly stored as one resultant image.

Various example embodiments of the present disclosure have been described in detail with reference to various drawings. It should be understood that the foregoing descriptions and accompanying drawings are intended to be illustrative, not limiting. Accordingly, one of ordinary skill in the art will understand that various modifications, variations and alternatives may be realized and may fall within the true spirit and full scope of the disclosure as defined in the following claims, and their equivalents.

What is claimed is:

1. An electronic device comprising:
a camera;
a display;
at least one memory; and
a processor operatively coupled to the camera, the display, and the memory, wherein the processor is configured to:
acquire an image of at least one external object through the camera in response to a first input corresponding to an execution command of the camera;
display at least one part of the acquired image as a preview image through the display, wherein the displaying comprises buffering the at least one part of the acquired image in the at least one memory;
acquire a still picture of the at least one external object using the acquired image in response to a second input corresponding to a still picture capture input during display of the preview image, and acquire video of the at least one external object using the buffered at least one part of the acquired image;
generate a still picture file having an image format based on the still picture and the video; and
store the still picture file in the at least one memory,
wherein the processor is configured to;
determine a device state in response to the first input;
determine a buffering type for buffering the at least one part of the acquired image at least partially based on the device state;
buffer the at least one part of the acquired image in the at least one memory with a first buffering type in response to the buffering type being determined to be the first buffering type; and
buffer the at least one part of the acquired image in the at least one memory with a second buffering type that is different from the first buffering type in response to the buffering type being determined to be the second buffering type, and
wherein the processor is further configured to determine the device state at least partially based on one or more of a size of the memory, electric current consumption of an encoder, image processing capability, or a high-resolution video capture.

2. The electronic device of claim 1, wherein the processor is further configured to generate the video based on images buffered for a specific time period before a time of the second input from the buffered at least one part of the acquired image in response to the second input.

3. The electronic device of claim 1, wherein the processor is further configured to determine the first buffering type if the size of the memory is less than a memory size threshold value and electric current consumption of the encoder is less than an electric current consumption threshold value, and to determine the second buffering type if the size of the memory is greater than the memory size threshold and the electric current consumption is less than the electric current consumption threshold value.

4. The electronic device of claim 1, wherein the processor is further configured to:
upon determining the first buffering type, acquire the video by encoding the preview image and thereafter buffering the encoded preview image; and
upon determining the second buffering type, acquire the video by buffering a YUV image included in the preview image and thereafter encoding the buffered YUV image.

5. The electronic device of claim 1, wherein the processor is further configured to:
if the second input corresponds to a continuous still image capture input, acquire a first still picture corresponding to a first time point and a second still picture corresponding to a second time point, and first video corresponding to the first still picture and second video corresponding to the second still picture; and
generate a first still picture file of an image format based on the first still picture and the first video, and a second still picture file of an image format based on the second still picture and the second video.

6. The electronic device of claim 5, wherein the processor is further configured to:

determine whether the second input is a single still picture capture input or the continuous still picture capture input, at least partially based on a capture interval time for capturing still images and a specific time period; and acquire video corresponding to the still picture based on whether the second input is determined to be the single still picture capture input or the continuous still picture capture input.

7. The electronic device of claim 6, wherein the processor is further configured to acquire the first video and the second video as a single video until a third time point at which the capture time interval is longer than the specific time period.

8. The electronic device of claim 1, wherein the processor is further configured to:
analyze, in response to a third input for selecting one of the stored images, the selected image;
determine a type of the selected image;
if the selected image is a still picture file comprising a video, divide a still picture part and a video part from the still picture file;
display the still picture by extracting the still picture part from the still picture file;
reproduce and display the video at a start location of the video part from the still picture file after displaying the still picture; and
display the still picture upon completion of the reproducing of the video.

9. The electronic device of claim 1, wherein the processor is further configured to:
analyze selected data in response to a fourth input for sharing data;
determine a type of the selected data;
if the selected data is a still picture file comprising video, determine a sharing scheme based on an interface for selecting the sharing scheme; and
share selectively the still picture file, a still picture of the still picture file, or a video of the still picture file in response to the determined sharing scheme.

10. A method of operating an electronic device, the method comprising:
acquiring an image through a camera in response to a first input corresponding to an execution command of the camera;
displaying the acquired image as a preview image through a display, and buffering at least one part of the acquired image in at least one memory;
acquiring a still picture from the acquired image in response to a second input corresponding to a still picture capture input, and acquiring video from the buffered at least one part of the acquired image;
generating a still picture file having an image format based on the still picture and the video; and
storing the still picture image in the memory,
wherein the buffering comprises:
determining a device state in response to the first input;
determining a buffering type for buffering the at least one part of the acquired image at least partially based on the device state;
buffering the at least one part of the acquired image in the at least one memory with a first buffering type in response to the buffering type being determined to be the first buffering type; and
buffering the at least one part of the acquired image in the at least one memory with a second buffering type that is different from the first buffering type in response to the buffering type being determined to be the second buffering type, and
wherein the determining of the device state comprises determining the device state at least partially based on one or more of a size of the memory, electric current consumption of an encoder, image processing capability, or a high-resolution video capture.

11. The method of claim 10, wherein the acquiring of the video comprises:
acquiring the video for a specific time period before a time of the second input from the buffered at least one part of the acquired image.

12. The method of claim 10, wherein the determining of the buffering type comprises determining the first buffering type if the size of the memory is less than a memory size threshold and electric current consumption of the encoder is less than an electric current consumption threshold, and determining the second buffering type if the size of the memory is greater than the memory size threshold and the electric current consumption is less than the electric current consumption threshold value.

13. The method of claim 10, wherein the buffering with the first buffering type comprises:
upon determining the first buffering type, acquiring the video by encoding the preview image and thereafter buffering the encoded preview image; and
wherein the buffering with the second buffering type comprises;
upon determining the second buffering type, acquiring the video by buffering a YUV image included in the preview image and thereafter encoding the buffered YUV image.

14. The method of claim 10, further comprising:
determining whether the second input is a single still picture capture input corresponding to a first capture scheme or a continuous still picture capture input corresponding to a second capture scheme, at least partially based on a capture interval time and a specific time period;
upon determining the single still picture capture input, acquiring an image for the specific time period before the time of the second input as video for one still picture based on the time of the second input, and generating a still picture file based on the still picture and the video; and
upon determining the continuous still picture capture input, continuously acquiring video until a time point at which the capture interval is longer than the specific time period, acquiring an image for a specific time period before each time point of capturing the still picture as respective videos corresponding to respective still pictures, and generating a plurality of still picture files based on the respective still pictures and the respective videos.

15. The method of claim 10, further comprising:
detecting an input for displaying one of still picture files stored in the memory;
dividing a still picture part and a video part from the still picture file;
displaying the still picture by extracting the still picture part from the still picture file;
reproducing and displaying video at a start location of the video part from the still picture file after displaying the still picture; and
displaying the still picture upon completion of the reproducing of the video.

16. The method of claim 10, further comprising:
detecting an input for sharing a still picture file stored in the memory;
determining a sharing scheme based on an interface for selecting the sharing scheme of the still picture file; and
sharing selectively the still picture file, a still picture of the still picture file, or a video of the still picture file in response to the determined sharing scheme.

\* \* \* \* \*